US012748923B1

(12) United States Patent
Swanson

(10) Patent No.: US 12,748,923 B1
(45) Date of Patent: Sep. 29, 2026

(54) MATCHER EXPRESSION EVALUATION ENGINE WITH TIERED PRIORITY COMPARATOR

(71) Applicant: Government Employees Insurance Company (GEICO), Fredericksburg, VA (US)

(72) Inventor: Daniel L. Swanson, Alexandria, VA (US)

(73) Assignee: Government Employees Insurance Company (GEICO), Fredericksburg, VA (US)

( * ) Notice: Subject to any disclaimer, the term of this patent is extended or adjusted under 35 U.S.C. 154(b) by 0 days.

(21) Appl. No.: 19/464,425

(22) Filed: Jan. 29, 2026

(51) Int. Cl.
*G06F 40/30* (2020.01)

(52) U.S. Cl.
CPC .................................... *G06F 40/30* (2020.01)

(58) Field of Classification Search
None
See application file for complete search history.

(56) References Cited

U.S. PATENT DOCUMENTS 6,567,805 B1 5/2003 Johnson et al.
7,565,642 B2 7/2009 Moore et al.
8,021,298 B2 9/2011 Baird et al.
9,082,309 B1 * 7/2015 Fuka ........................ G09B 7/00
9,348,677 B2 5/2016 Marinelli, III et al.
9,607,035 B2 * 3/2017 Allen ........................ G06N 7/01
9,662,503 B2 5/2017 Kaula et al.
10,672,510 B1 6/2020 Shtirberg et al.
(Continued)

OTHER PUBLICATIONS

Alchemer, Understanding Piped/Repeated Data Alchemer Survey Building Documentation, https://help.alchemer.com/help/piped-data, Published Jan. 23, 2026, 13 Pages.
(Continued)

*Primary Examiner* — Douglas Godbold
(74) *Attorney, Agent, or Firm* — Sterne, Kessler, Goldstein & Fox P.L.L.C.

(57) ABSTRACT

Disclosed herein are system, method, and/or computer program product aspects, and/or combinations thereof, for a runtime-configurable question-and-answer system that dynamically determines question flow and ordering without hard-coded logic. The system includes a domain-agnostic evaluation engine that evaluates matcher expressions against a context object, a matcher expression evaluation system that determines question visibility and behavior using configurable expressions, a context object builder that aggregates data from multiple sources, and a tiered priority comparator that determines question ordering through a five-tier comparison algorithm enabling both iteration and grouping behaviors. The system also includes a container question architecture for hierarchical data collection, an auto-answer staging system for propagating answers, and a schema-agnostic data integration system for operating on untyped key-value data structures without code changes. The system enables runtime configuration of questions, ordering, and conditional logic without code deployment, improving flexibility and reducing maintenance burden compared to traditional hard-coded systems.

30 Claims, 11 Drawing Sheets

(56) References Cited

U.S. PATENT DOCUMENTS

| | | | | |
|---|---|---|---|---|
| 10,789,219 | B1 * | 9/2020 | Anagnoson | G06F 40/174 |
| 11,822,605 | B2 | 11/2023 | Datla et al. | |
| 11,900,065 | B1 | 2/2024 | Sullivan et al. | |
| 12,211,511 | B1 * | 1/2025 | Sandrew | G06F 40/58 |
| 12,333,246 | B1 * | 6/2025 | Gupta | G06N 5/01 |
| 12,386,794 | B2 | 8/2025 | McCreary et al. | |
| 2005/0055321 | A1 | 3/2005 | Fratkina et al. | |
| 2007/0198572 | A1 | 8/2007 | Sciuk | |
| 2008/0195378 | A1 * | 8/2008 | Nakazawa | G06F 16/3329 707/E17.058 |
| 2009/0216628 | A1 | 8/2009 | Pandey et al. | |
| 2011/0010202 | A1 * | 1/2011 | Neale | G06N 5/025 706/47 |
| 2011/0153537 | A1 | 6/2011 | Hiltunen et al. | |
| 2014/0272904 | A1 | 9/2014 | Bagchi et al. | |
| 2014/0372955 | A1 | 12/2014 | Berry et al. | |
| 2016/0275627 | A1 * | 9/2016 | Wang | G06Q 40/123 |
| 2019/0180639 | A1 * | 6/2019 | Dechu | G06N 5/02 |
| 2020/0152315 | A1 | 5/2020 | Shtirberg et al. | |
| 2021/0150925 | A1 * | 5/2021 | Birchfield | G09B 5/00 |
| 2021/0391039 | A1 * | 12/2021 | Laszlo | G16H 10/20 |
| 2023/0229639 | A1 | 7/2023 | McCreary et al. | |
| 2024/0330796 | A1 * | 10/2024 | Pandey | G06Q 10/063112 |

OTHER PUBLICATIONS

Javetski, “Repeat Groups” CommCare Public Documentation, https://dimagi.atlassian.net/wiki/spaces/commcarepublic/pages/2143956644/Repeat+Groups, Published Jan. 23, 2026, 9 Pages.

Freitas, A. et al., On the Semantic Mapping of Schema-agnostic Queries: A Preliminary Study, Federal University of Rio de Janeiro, Jan. 23, 2026, 12 Pages.

Kobotoolbox, “Grouping questions and repeating groups” KoboToolbox Formbuilder Documentation, https://support.kobotoolbox.org/group_repeat.html, Last Updated Nov. 25, 2025, 8 Pages.

Illinois Redcap “Repeating Data Collection in REDCap” Illinois REDCap Documentation, IHSI Version, https://ws.engr.illinois.edu/sitemanager/getfile.asp?id=3284, Published Jul. 14, 2022, 6 Pages.

SurveyJS, “How to Carry Forward Responses” SurveyJS Survey Creator Documentation, https://surveyjs.io/survey-creator/documentation/end-user-guide/carry-forward-responses, Available as of Jan. 23, 2026, 15 Pages.

SurveyCTO, “Rosters: Collecting repeated information with multiple repeats” SurveyCTO Documentation, https://docs.surveycto.com/02-designing-forms/04-sample-forms/10.rosters-multiple-repeat.html, Available as of Jan. 23, 2026, 3 Pages.

Surveymonkey, “Carry Forward Responses” SurveyMonkey Help Documentation, https://help.surveymonkey.com/en/surveymonkey/create/carry-forward, Available as of Jan. 23, 2026, 8 Pages.

Qualtrics, “Piped Text Overview”, Qualtrics Platform Documentation, https://www.qualtrics.com/support/survey-platform/survey-module/editing-questions/piped-text/piped-text-overview/, Available as of Jan. 23, 2026, 30 Pages.

Thomson Reuters, “Presentation of repeated variables in the questionnaire” Thomson Reuters Contract Express Help Documentation, https://www.thomsonreuters.com/en-us/help/contract-express/spans/repeat-spans/presentation-of-repeated-variables-in-the-question, Available as of Jan. 23, 2026, 11 Pages.

Surveymonkey, “Advanced Branching” Survey Monkey Help Documentation, https://help.surveymonkey.com/en/surveymonkey/create/advanced-branching/, Available as of Jan. 23, 2026, 23 Pages.

Wikipedia Contributors, “MVEL” Wikipedia, https://en.wikipedia.org/wiki/MVEL. Last updated Jun. 15, 2016, 2 Pages.

* cited by examiner

MATCHER EXPRESSION EVALUATION ENGINE WITH TIERED PRIORITY COMPARATOR

CROSS-REFERENCE TO RELATED APPLICATIONS AND INCORPORATION BY REFERENCE

This application is related to U.S. patent application Ser. No. 19/464,432, entitled "Container Question Architecture with Auto-Answer Propagation and Schema-Agnostic Data Integration," filed herewith, which is incorporated by reference herein in its entirety.

FIELD OF THE INVENTION

The technology relates to systems and methods for dynamically determining question flow and ordering in runtime-configurable question-and-answer systems. The technology also relates to systems and methods for collecting hierarchical data structures and integrating with multiple backend systems without code change.

BACKGROUND

Enterprise question-and-answer systems, such as those used in insurance intake, medical questionnaires, and customer onboarding, may suffer from fundamental architectural limitations that require manual end-to-end designs. Traditional systems may include hard-coded question pages where every question screen is statically coded, with each variable scenario embedded directly in the application code. Such systems may also include rigid branching logic where conditional paths are hard-wired into the codebase, requiring developer intervention for any change.

These traditional systems may be tightly bound to specific data schemas, requiring code changes when integrating with different backend systems. When the same question must appear in multiple contexts or flows, the logic may be duplicated, leading to maintenance burden and inconsistencies. Any modification to questions, ordering, or conditional logic may require a full software development lifecycle including planning, coding, testing, and deployment.

The consequences of these limitations may include weeks of planning meetings to implement simple question changes, consumption of developer, QA (Quality Assurance), and DevOps (Development Operations) resources for business-logic changes, inability to rapidly iterate on question flows based on user behavior data, no ability to A/B test question variations without separate deployments, and high cost of supporting multiple tenants with different question requirements.

There remains a need for a runtime-configurable question-and-answer system that can dynamically determine question flow and ordering without hard-coded logic, that can collect hierarchical data structures automatically, and that can integrate with multiple backend systems without code changes.

U.S. Patent Application Publication No. 2005/0055321 (Avolin LLC®) "System and method for providing an intelligent multi-step dialog with a user" is incorporated by reference in its entirety. This Patent discusses a system that uses knowledge structures to represent problem domains and user interests, allowing for a personalized dialog that elicits unstated elements of a problem description through a dialog engine interacting with users via various communication channels. The system uses knowledge maps, knowledge containers, and dialog control information to provide multi-step interactive dialogs.

U.S. Pat. No. 12,211,511 (Sandrew) "System that conducts and evaluates oral question-and-answer sessions using artificial intelligence" is incorporated by reference in its entirety. This Patent discusses an artificial intelligence system that conducts oral question-and-answer sessions with respondents to achieve educational outcomes, using an artificial intelligence (AI) engine with large language models, text-to-speech and speech-to-text converters, and dialog context information to generate questions and evaluate responses.

U.S. Pat. No. 9,082,309 (Fuka) "Dynamic question template system and architecture" is incorporated by reference in its entirety. This Patent discusses a system for dynamically generating questions useful for student evaluation, including dynamic question templates with question variables, correct answers, and question constraints, where the system can pre-generate or dynamically generate unique question variants using template objects and object libraries.

U.S. Pat. No. 9,348,677 (Marinelli et al.) "System and method for batch evaluation programs" is incorporated by reference in its entirety. This Patent discusses a batching module that inspects call stacks within a stack evaluator to identify expressions that can be evaluated in batch with other expressions, transmitting batch processing requests to an application server for processing expressions in batch to improve efficiency.

U.S. Pat. No. 11,822,605 (Datla et al.) "Multi domain real-time question answering system" is incorporated by reference in its entirety. This Patent discusses a system for automated question answering that decomposes questions into domains, keywords, and focus words, identifies similar questions in a semantic space, extracts and ranks answers, and fine-tunes answers using domain, keyword, and focus word information.

U.S. Patent Application Publication No. 2007/0198572 (Sciuk) "Automated system and method for managing a process for the shopping and selection of human entities" is incorporated by reference in its entirety. This Patent discusses a matching system for providing a degree of matching between entities using cascading information requests, attribute receiving modules, and degree modules that compare attribute information in light of additional attribute information.

U.S. Patent Application Publication No. 2008/0195378 (Nakazawa et al.) "Question and Answer Data Editing Device, Question and Answer Data Editing Method and Question Answer Data Editing Program" is incorporated by reference in its entirety. This Patent discusses a device that detects similar dialogue content from past customer interactions, extracts expression patterns and variations, and registers them as index information to enhance the editing and indexing of question and answer data.

U.S. Patent Application Publication No. 2014/0272904 (International Business Machines Corp.) "Combining different type coercion components for deferred type evaluation" is incorporated by reference in its entirety. This Patent discusses mechanisms for validating candidate answers in question and answer systems using pluggable validators and validation status tracking objects to gather information on the correctness of candidate answers, including supporting evidence and performance metrics.

U.S. Pat. No. 6,567,805 (Johnson et al.) "Interactive automated response system" is incorporated by reference in its entirety. This Patent discusses a computerized system that responds to queries in the context of a dialog with a user, including a text categorizer, search system, and dialog manager that maintains session history and uses a partially ordered category scheme to categorize dialog stages and create suitable responses.

U.S. Pat. No. 9,607,035 (International Business Machines Corp.) "Extensible validation framework for question and answer systems" is incorporated by reference in its entirety. This Patent discusses mechanisms for validating candidate answers to input questions using validators selected based on characteristics of correct answers, where validation information is generated and stored in validation status objects.

U.S. Pat. No. 7,565,642 (Moore et al.) "Rule engine" is incorporated by reference in its entirety. This Patent discusses methods and apparatus for inference processing in a fact-based business automation system, including receiving a rule set as a single package, generating a dependency graph for the rule set, and generating a sequence of processing logic for optimal processing of inputted facts.

U.S. Patent Application Publication No. 2009/0216628 (Pandey et al.) "Configurable, questionnaire-based project assessment" is incorporated by reference in its entirety. This Patent discusses project assessment techniques that automatically select questionnaires based on project specification data describing skill sets or domains, where each questionnaire comprises questions concerning best practices applicable to the corresponding skill set.

U.S. Pat. No. 11,900,065 (Sullivan et al.) "Automated expression parallelization" is incorporated by reference in its entirety. This Patent discusses a system capable of automatically adjusting or reconstructing a baseline expression to generate a parallelized expression, where elements of the expression are identified, grouped into a parse tree representation, classified as eligible or not eligible for parallel processing, and evaluated on non-primary threads in parallel with a primary thread.

U.S. Patent Application Publication No. 2014/0372955 (Berry et al.) "Visual selection of an anatomical element for requesting information about a medical condition" is incorporated by reference in its entirety. This Patent discusses a system that presents users with an anatomical assembly representing an anatomical region of the human body, including user-selectable display elements which, when selected, indicate areas in the anatomical assembly representing areas in which a medical symptom is experienced. Upon receiving user input selecting one of the user-selectable elements, the user is presented with a selection of medical conditions corresponding to the selected element and information about medical specialists.

U.S. Patent Application Publication No. 2020/0152315 (Shtirberg et al.) "Medical user interface" is incorporated by reference in its entirety. This Patent discusses a system including a medical device to form a three-dimensional (3D) image of an anatomical structure, a user interface including a display and an input device, and a processor to prepare a user interface screen presentation including a graphical representation of the anatomical structure. The system generates a feature list of features associated with the anatomical structure and automatically rotates the graphical representation from a first view to a second view showing a selected feature when the feature is selected from the list.

U.S. Patent Application Publication No. 2023/0229639 (McCreary et al.) "Predictive recommendations for schema mapping" is incorporated by reference in its entirety. This Patent discusses methods for recommending cross-schema mappings between an external data element type of a first schema and canonical data element types of a second schema. The method includes identifying canonical data element types and an external data element type, obtaining multi-dimensional representations for each data element type, determining predicted similarity scores using a mapper machine learning model, and generating recommendation data objects indicating mappings between the external data element type and selected canonical data element types.

U.S. Pat. No. 8,021,298 (Baird et al.) "System and method for mapping pain depth" is incorporated by reference in its entirety. This Patent discusses a pain depth mapping system and method for mapping the location and depth of pain experienced by a user. The system displays one or more body representations with symptom representations representing the location of pain, allows the user to delineate user-defined pain depth regions on a cross-section of the body representation, and may allow the user to vary the pain intensity represented by the symptom representations.

U.S. Pat. No. 9,662,503 (Kaula et al.) "System and method of displaying stimulation map and pain map overlap coverage representation" is incorporated by reference in its entirety. This Patent discusses a method of displaying pain or stimulation experienced by a patient that includes concurrently displaying a first map and a second map via a graphical user interface, where the first map and the second map are each a pain map or a stimulation map. The method includes displaying a virtual control mechanism and adjusting respective visual emphases of the first map and the second map in response to engagement of the virtual control mechanism.

SUMMARY OF THE INVENTION

In one aspect, a runtime-configurable question-and-answer system dynamically determines question flow and ordering. The system includes hardware processors and memories. The processors implement a domain-agnostic evaluation engine that evaluates matcher expressions against a context object. The evaluation engine contains no hard-coded questions, answer options, or branching logic. The evaluation engine has no knowledge of a business domain until configuration data is loaded. The system includes a matcher expression evaluation system that determines question visibility, qualification, and post-answer behavior. The matcher expression evaluation system supports three matcher types: askWhen matchers, askIf matchers, and contextUpdates matchers. The system includes a context object builder that builds the context object from various sources of information, such as session data and prior answers. The context object builder provides a unified evaluation environment. The system includes a tiered priority comparator that determines question ordering through a multi-tier comparison algorithm. The tiered priority comparator enables both iteration behavior and grouping behavior. The tiered priority comparator evaluates candidates through five tiers: current context bias, parent priority, current question line bias, explicit question priority, and question identifier as a tiebreaker.

In another aspect, a method dynamically determines question flow and ordering in a runtime-configurable question-and-answer system. The method includes building a context object from various sources of information, such as session data and prior answers. The method includes evaluating matcher expressions against the context object using a domain-agnostic evaluation engine. The evaluation engine contains no hard-coded questions, answer options, or branching logic. The evaluation engine has no knowledge of a business domain until configuration data is loaded. The method includes determining question visibility, qualification, and post-answer behavior using a matcher expression evaluation system. The matcher expression evaluation system supports three matcher types: askWhen matchers, askIf matchers, and contextUpdates matchers. The method includes determining question ordering using a tiered priority comparator. The tiered priority comparator evaluates candidates through five tiers and enables both iteration behavior and grouping behavior.

In another aspect, a non-transitory computer-readable storage medium stores instructions that cause hardware processors to perform operations. The operations include building a context object from various sources of information, such as session data and prior answers. The operations include evaluating matcher expressions against the context object using a domain-agnostic evaluation engine. The evaluation engine contains no hard-coded questions, answer options, or branching logic. The evaluation engine has no knowledge of a business domain until configuration data is loaded. The operations include determining question visibility, qualification, and post-answer behavior using a matcher expression evaluation system. The matcher expression evaluation system supports three matcher types: askWhen matchers, askIf matchers, and contextUpdates matchers. The operations include determining question ordering using a tiered priority comparator. The tiered priority comparator evaluates candidates through five tiers and enables both iteration behavior and grouping behavior.

In another aspect, a runtime-configurable question-and-answer system dynamically determines question flow and ordering. The system includes hardware processors and memories. The processors implement means for evaluating matcher expressions against a context object using a domain-agnostic evaluation engine. The evaluation engine contains no hard-coded questions, answer options, or branching logic. The evaluation engine has no knowledge of a business domain until configuration data is loaded. The system includes means for determining question visibility, qualification, and post-answer behavior using configurable expression language expressions. The expression language expressions support three matcher types: askWhen matchers, askIf matchers, and contextUpdates matchers. The system includes means for building the context object from various sources of information, such as session data and prior answers. The context object builder provides a unified evaluation environment. The system includes means for determining question ordering through a multi-tier comparison algorithm. The means for determining question ordering enables both iteration behavior and grouping behavior. The means for determining question ordering evaluates candidates through five tiers: current context bias, parent priority, current question line bias, explicit question priority, and question identifier as a tiebreaker.

In another aspect, a runtime-configurable question-and-answer system collects hierarchical data structures and integrates with multiple backend systems. The system includes hardware processors and memories. The processors implement a container question architecture that supports container creator questions and container iterator questions. Container creator questions create multiple entities stored in a staging area with indexed contexts. Container iterator questions automatically repeat for each created entity with answers properly grouped by iteration context. The system includes an auto-answer staging system that stores auto-generated answers in a staging area. The auto-answer staging system processes staged auto-answers through a normal answer processing flow using a conditional matcher. The conditional matcher processes questions only when they have not been auto-answered. The conditional matcher ensures auto-answers are treated the same as user-provided answers. The conditional matcher generates any follow-up questions that may be needed. The system includes a schema-agnostic data integration system that operates on untyped key-value data structures. The system operates on arbitrary data schemas from multiple external systems without code changes. The system operates without knowing the specific structure of the data it processes. The system includes an identifier (ID) mapping system with configurable expression language scripts. The ID mapping system transforms identifiers between systems and enables seamless integration with multiple backend systems.

In another aspect, a method collects hierarchical data structures and integrates with multiple backend systems in a runtime-configurable question-and-answer system. The method includes creating multiple entities using container creator questions. The entities are stored in a staging area with indexed contexts. The method includes automatically repeating container iterator questions for each created entity. Answers are properly grouped by iteration context. The method includes storing auto-generated answers in a staging area when users answer comprehensive overview questions. The method includes processing the staged auto-answers through a normal answer processing flow using a conditional matcher. The conditional matcher processes questions only when they have not been auto-answered. The conditional matcher ensures auto-answers are treated the same as user-provided answers. The conditional matcher generates any follow-up questions that may be needed. The method includes operating on untyped key-value data structures rather than strongly-typed objects. The method enables operation on arbitrary data schemas from multiple external systems without code changes. The system operates without knowing the specific structure of the data it processes. The method includes transforming identifiers between systems using configurable expression language scripts. The ID mapping system enables seamless integration with multiple backend systems.

In another aspect, a non-transitory computer-readable storage medium stores instructions that cause hardware processors to perform operations. The operations include creating multiple entities using container creator questions. The entities are stored in a staging area with indexed contexts. The operations include automatically repeating container iterator questions for each created entity. Answers are properly grouped by iteration context. The operations include storing auto-generated answers in a staging area when users answer comprehensive overview questions. The operations include processing the staged auto-answers through a normal answer processing flow using a conditional matcher. The conditional matcher processes questions only when they have not been auto-answered. The conditional matcher ensures auto-answers are treated the same as user-provided answers. The conditional matcher generates any follow-up questions that may be needed. The operations include operating on untyped key-value data structures rather than strongly-typed objects. The operations enable operation on arbitrary data schemas from multiple external systems without code changes. The system operates without knowing the specific structure of the data it processes. The operations include transforming identifiers between systems using configurable expression language scripts. The ID mapping system enables seamless integration with multiple backend systems.

In another aspect, a runtime-configurable question-and-answer system collects hierarchical data structures and integrates with multiple backend systems. The system includes hardware processors and memories. The processors implement means for creating multiple entities using container creator questions. The entities are stored in a staging area with indexed contexts. The system includes means for automatically repeating container iterator questions for each created entity. Answers are properly grouped by iteration context. The system includes means for storing auto-generated answers in a staging area when users answer comprehensive overview questions. The system includes means for processing the staged auto-answers through a normal answer processing flow using a conditional matcher. The conditional matcher processes questions only when they have not been auto-answered. The conditional matcher ensures auto-answers are treated the same as user-provided answers. The conditional matcher generates any follow-up questions that may be needed. The system includes means for operating on untyped key-value data structures rather than strongly-typed objects. The system enables operation on arbitrary data schemas from multiple external systems without code changes. The system operates without knowing the specific structure of the data it processes. The system includes means for transforming identifiers between systems using configurable expression language scripts. The means for transforming identifiers enables seamless integration with multiple backend systems.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

The following detailed description sets forth various aspects of a runtime-configurable question-and-answers system for dynamically determining question flow and ordering. The description provides specific details for a thorough understanding of the aspects. However, one skilled in the art will understand that the aspects may be practiced without many of these details. In some instances, well-known structures and functions have not been shown or described in detail to avoid unnecessarily obscuring the description of the aspects.

The terminology used in the description is intended to be interpreted in its broadest reasonable manner, even though it is being used in conjunction with a detailed description of certain specific aspects. Certain terms may be emphasized below; any terminology intended to be interpreted in any restricted manner will be overtly and specifically defined in this detailed description section.

FIG. 1: System Architecture Overview

Figure 1A:
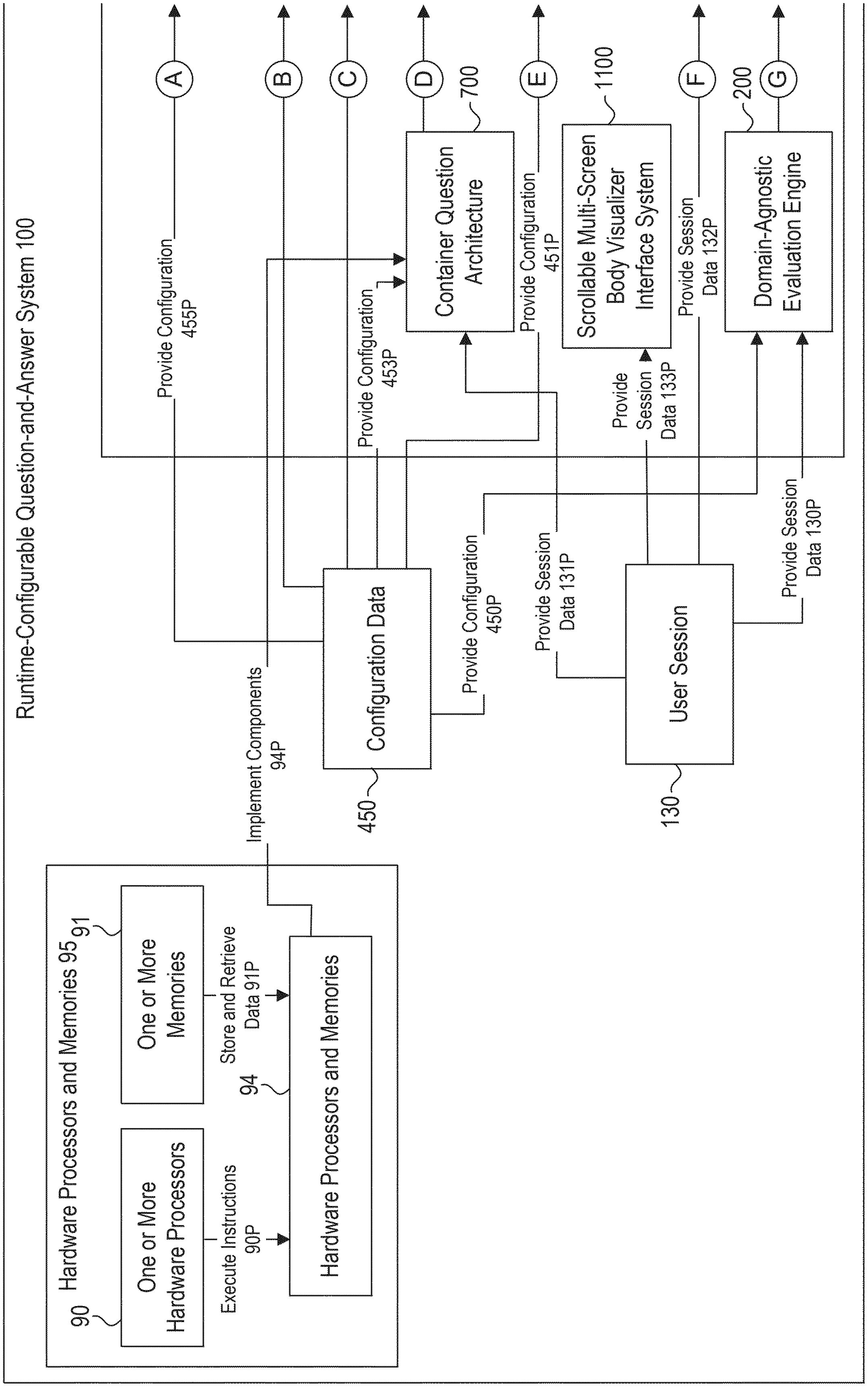
FIG. 1A illustrates part of a system architecture overview showing all major components of the runtime-configurable question-and-answer system, in accordance with some aspects.
Figure 1B:
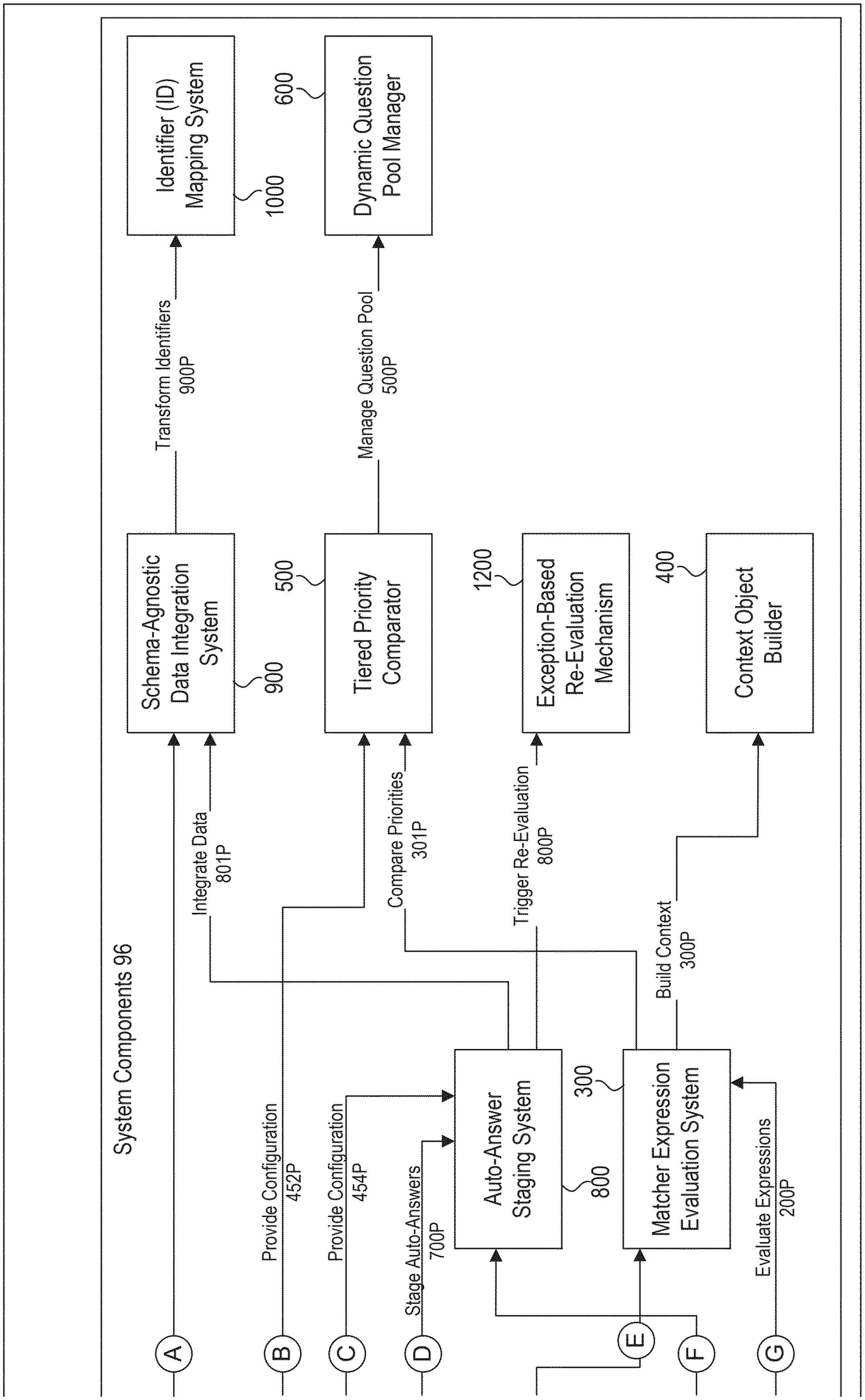
FIG. 1B illustrates part of a system architecture overview showing all major components of the runtime-configurable question-and-answer system, in accordance with some aspects.

Referring now to FIGS. 1A and 1, a runtime-configurable question-and-answer system 100 for dynamically determining question flow and ordering is illustrated in accordance with some aspects. FIGS. 1A and 1B depict two portions of a system architecture, and, as such, they are intended to be viewed together, with arrows and letters (e.g., A, B, C, etc.) for demonstrating connections between components between FIGS. 1A and 1B. FIG. 1A includes hardware processors and memories 95, configuration data 450, user session 130, container question architecture 700, scrollable multi-screen body visualizer interface system 1100, and domain-agnostic evaluation engine 200 as well as connections to components of FIG. 1B. FIG. 1B includes auto-answer staging system 800, matcher expression evaluation system 300, schema-agnostic data integration system 900, tiered priority comparator 500, exception-based re-evaluation mechanism 1200, context object builder 400, identifier (ID) mapping system 1000, and dynamic question pool manager 600 as well as connections to components of FIG. 1A. The system 100 may comprise one or more hardware processors 90 and one or more memories 91, coupled to the one or more hardware processors 90. The hardware processors 90 and memories 91 may form a hardware processors and memories group 94 within a hardware processors and memories subsystem 95. The one or more hardware processors 90 may be configured to implement various components within a system components subsystem 96 as described below, including, for example, the domain-agnostic evaluation engine 200, the matcher expression evaluation system 300, the context object builder 400, the tiered priority comparator 500, the dynamic question pool manager 600, the container question architecture 700, the auto-answer staging system 800, the schema-agnostic data integration system 900, the ID mapping system 1000, the scrollable multi-screen body visualizer interface system 1100, and the exception-based re-evaluation mechanism 1200.

The system 100 may include a domain-agnostic evaluation engine 200 configured to evaluate matcher expressions against a context object containing session data, claim information, and prior answers. As a technical feature, the evaluation engine 200 may contain no hard-coded questions, answer options, or branching logic, and may have no knowledge of a business domain until configuration data is loaded. This domain-agnostic architecture represents a significant technical improvement because it may enable the system to operate across different business domains, simply by loading different configuration data.

The system 100 may include a matcher expression evaluation system 300 configured to determine question visibility, qualification, and post-answer behavior using configurable expression language expressions. The matcher expression evaluation system 300 may support three matcher types: askWhen matchers that determine whether a question can be shown at all, askIf matchers that determine whether a question should be shown now, and contextUpdates matchers that determine what session state changes when a question is answered. The matcher expression evaluation system 300 may be further detailed in FIG. 2.

The system 100 may include a context object builder 400 configured to build the context object from session data, claim information, and prior answers, providing a unified evaluation environment. The context object builder 400 may aggregate data from multiple sources including session data 420, claim information 430, prior answers 440, and configuration data 450. The context object builder 400 may be further detailed in FIG. 4.

The system 100 may include a tiered priority comparator 500 configured to determine question ordering through a multi-tier comparison algorithm that may enable both iteration behavior and grouping behavior. As a technical feature, the tiered priority comparator 500 may evaluate candidates through five tiers: a first tier that may evaluate current context bias as highest priority to enable iteration behavior, a second tier that may evaluate parent priority to maintain question line hierarchy, a third tier that may evaluate current question line bias to enable grouping behavior, a fourth tier that may evaluate explicit question priority, and a fifth tier that may evaluate question identifier as a deterministic tiebreaker. This five-tier approach represents a significant technical improvement because it may enable the system to support both iteration behavior (asking the same question type across multiple entities) and grouping behavior (completing all questions for one entity before moving to the next) through a single unified algorithm. The tiered priority comparator 500 may be further detailed in FIG. 3.

The system 100 may include a dynamic question pool manager 600 configured to manage question pools dynamically and update question pools on-demand based on matcher evaluation results. The dynamic question pool manager 600 may update question pools when, for example, the pool becomes empty or when matcher evaluation results indicate new eligible questions.

The system 100 may include a container question architecture 700 configured to support container creator questions that create multiple entities stored in a staging area with indexed contexts, and container iterator questions that automatically repeat for each created entity, with answers properly grouped by iteration context. The container question architecture 700 may be further detailed in FIG. 5.

The system 100 may include an auto-answer staging system 800 configured to store auto-generated answers in a staging area when users answer comprehensive overview questions, and process the staged auto-answers through a normal answer processing flow using a conditional matcher. The conditional matcher may, for example, process questions only when they have not been auto-answered. In some aspects, the conditional matcher may be configured to skip and/or bypass questions that have been auto-answered. The auto-answer staging system 800 may be further detailed in FIG. 6.

The system 100 may include a schema-agnostic data integration system 900 configured to operate on untyped key-value data structures rather than strongly-typed objects, which may enable operation on arbitrary data schemas from multiple external systems. As a technical feature, the system may operate without knowing the specific structure of the data it processes. This schema-agnostic approach represents a significant technical improvement because it may enable seamless integration with multiple backend systems, reducing or eliminating the need for code changes for each new data schema. The schema-agnostic data integration system 900 may be further detailed in FIG. 7.

The system 100 may include an ID mapping system 1000 with configurable expression language scripts configured to transform identifiers between systems, enabling seamless integration with multiple backend systems.

The system 100 may include a scrollable multi-screen body visualizer interface system 1100 configured to produce a progressive, scrollable multi-screen body visualizer interface that may enable users to identify and select specific body parts where injuries occurred, optimized for mobile devices with finger-based interaction. The scrollable multi-screen body visualizer interface system 1100 may be further detailed in FIG. 8.

The system 100 may include an exception-based re-evaluation mechanism 1200 configured to ensure all questions are properly re-evaluated with updated context after auto-answers are processed, maintaining data consistency across the question flow.

The system 100 may receive configuration data 450 that provides question definitions, conditional expressions, and flow rules. The configuration data 450 may be modified without code deployment, enabling business users to configure and deploy different question flows without developer intervention.

The system 100 may interact with a user session 130 that provides session data including user responses, current context, and session state. The user session 130 may track the progress of a question-and-answer session and maintain state throughout the interaction.

The one or more hardware processors 90 may execute instructions 90P to implement the various components of the system 100. The one or more memories 91 may store and retrieve data 91P for use by the one or more hardware processors 90. The hardware processors 90 and memories 91 may form a hardware processors and memories group 94 within a hardware processors and memories subsystem 95. The hardware processors and memories group 94 may implement various components within a system components subsystem 96, including the container question architecture 700 and other system components (e.g., components described herein).

FIG. 2: Matcher Expression Evaluation System

Figure 2A:
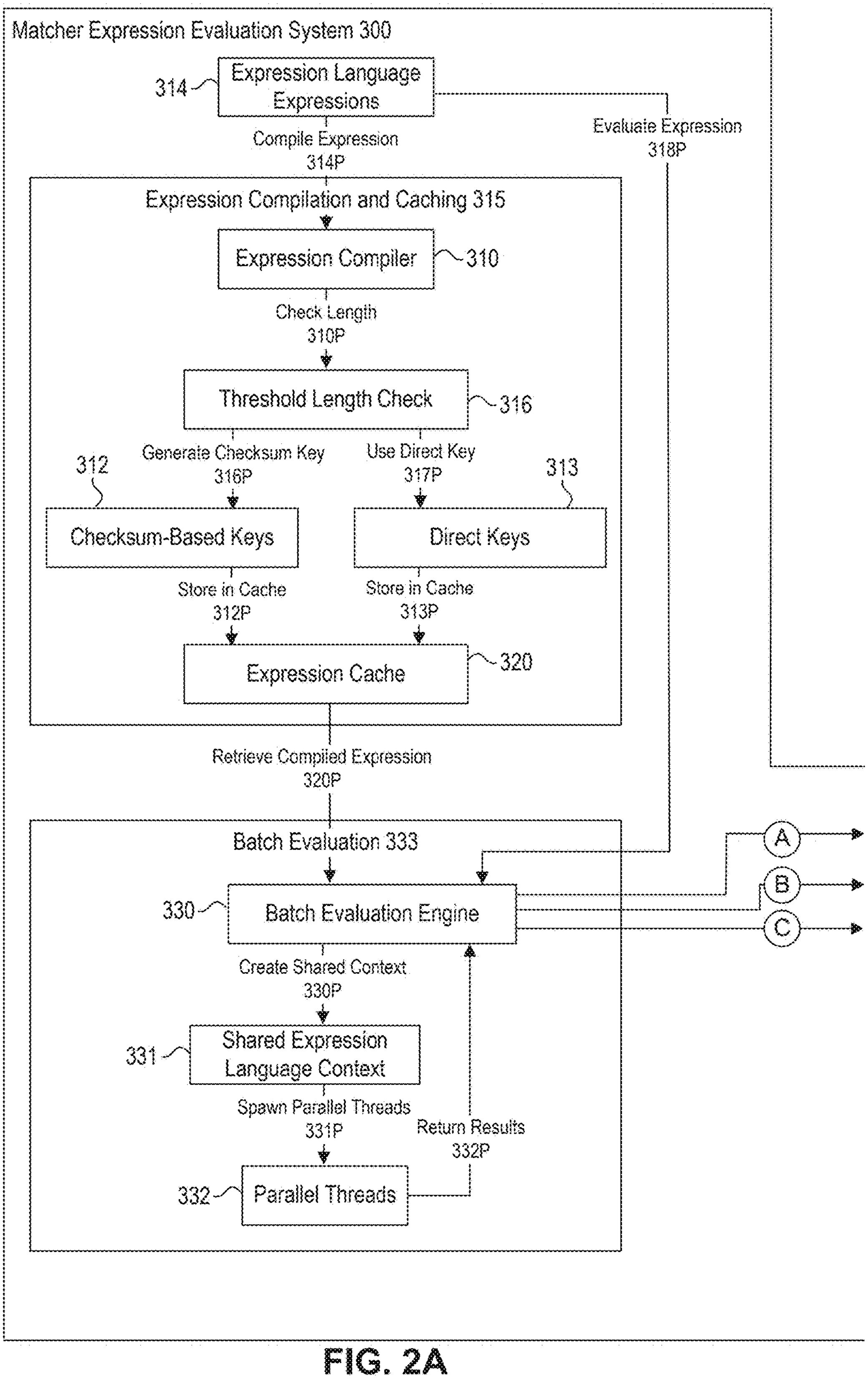
FIG. 2A illustrates part of a detailed view of the matcher expression evaluation system showing expression compilation, caching, and batch evaluation, in accordance with some aspects.
Figure 2B:
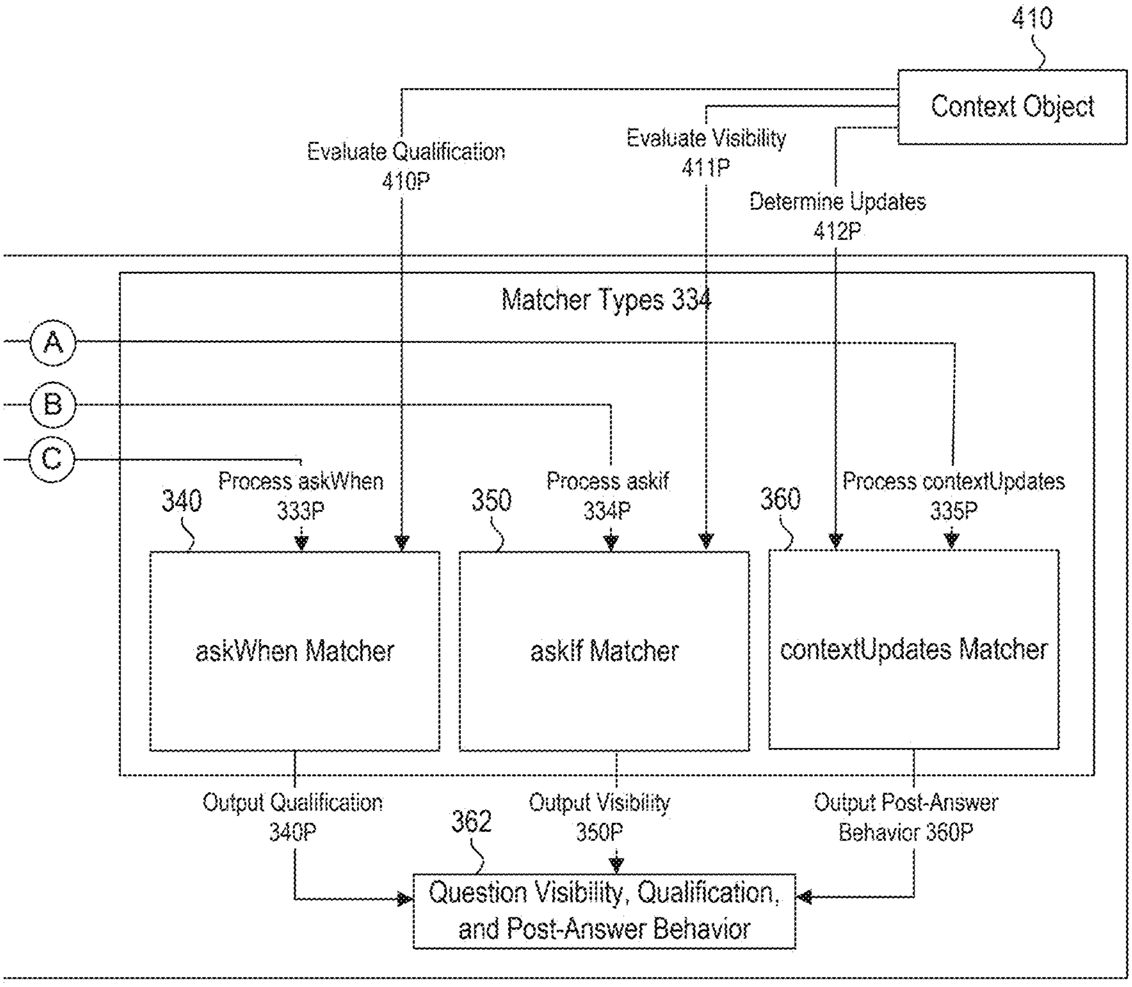
FIG. 2B illustrates part of a detailed view of the matcher expression evaluation system showing expression compilation, caching, and batch evaluation, in accordance with some aspects.

Referring now to FIGS. 2A and 2B, a detailed view of the matcher expression evaluation system 300 is illustrated in accordance with some aspects. FIGS. 2A and 2B depict two portions of an architecture for matcher expression evaluation system 300, and, as such, they are intended to be viewed together, with arrows and letters (e.g., A, B, C, etc.) for demonstrating connections between components between FIGS. 2A and 2B. FIG. 2A includes expression language expressions 314, expression compilation and caching 315, expression compiler 310, threshold length check 316, checksum-based keys 312, direct keys 313, expression cache 320, batch evaluation 333, batch evaluation engine 330, shared expression language context 331, and parallel threads 332 as well as connections to components of FIG. 2B. FIG. 2B includes context object 410, askWhen matcher 340, askIf matcher 350, contextUpdates matcher 360, and question visibility, qualification, and post-answer behavior 362 (also referred to as output 362) as well as connections to components of FIG. 2A. The matcher expression evaluation system 300 and/or components depicted in FIGS. 2A and 2B may be implemented by processing logic that can comprise hardware (e.g., circuitry, dedicated logic, programmable logic, microcode, etc.), software (e.g., instructions executing on a processing device), or a combination thereof. It is to be appreciated that not all components may be needed to perform the capabilities provided herein. The components of FIGS. 2A and 2B shall be described with reference to FIGS. 1A-1B and 3-9. However, FIGS. 2A and 2B are not limited to these example aspects.

The matcher expression evaluation system 300 may be configured to determine question visibility, qualification, and post-answer behavior using configurable expression language expressions. The matcher expression evaluation system 300 may include an expression language expressions 314, an expression compilation and caching subsystem 315, a batch evaluation subsystem 333, matcher types 334, and an output 362.

The matcher expression evaluation system 300 may include expression compilation and caching 315, which may additionally include an expression compiler 310 configured to compile expression language expressions for evaluation (e.g., compile expression 314P). Expression language expressions may be written in a model view expression language that may allow access to nested properties in the context object to perform calculations and call functions. The expression compiler 310 may compile these expressions into an executable form that can be efficiently evaluated against the context object. For example, expression compiler 310 may be configured to pre-compile expressions prior to evaluation and/or execution of the pre-compiled expression. Such pre-compilation can provide computationally efficient expenditure of computational resources, such as, but limited to, computational time and processing power. Particularly, pre-compiled and/or cached expressions may save computational time, providing responses and/or evaluations in microsecond time. By contrast, conventional systems, relying on runtime compilation, often provide millisecond-level responses. By providing multiple orders of magnitude of computational time efficiency, the pre-compilation, particularly when combined with expression cache 320, described below, reflects a technical enhancement for systems and/or methods relying on real-time operations and/or responses.

In some aspects, expression cache 320 may be a local cache, locally accessible to runtime-configurable question-and-answer system 100. In some aspects, expression cache 320 may be a remote cache, such as a cache of a network, accessible by a plurality of systems, platforms, and/or applications. In some aspects, the pre-compiled expressions may be cached in both a local cache and a cache of the network described above. Such configuration may facilitate local access and networked access. In some aspects, the local and network cache configuration may provide access to a plurality of systems, platforms, and/or applications, such as, for example, in a distributed system implementation. Additionally, such configuration may further preserve computational resources (such as those described herein) across an aggregate of systems, platforms, and/or applications, thereby preventing redundant compilation of expressions that require repeated evaluation.

The matcher expression evaluation system 300 and/or expression compilation and caching 315 may additionally include an expression cache 320 configured to cache compiled expressions using a threshold-based dual caching strategy. Expression cache 320 may map keys (e.g., strings, checksums, hashes, etc.) to objects (e.g., pre-compiled expressions). As a technical feature, expressions longer than a threshold length may use checksum-based keys for caching, while expressions shorter than the threshold length may use direct keys for caching. For example, expression compilation and caching 315 and/or expression compiler 310 may be configured to check length 310P via threshold length check 316. Based on the length, expression compilation and caching 315 and/or expression compiler 310 may be configured to generate checksum key 316P via checksum-based keys 312 and subsequently store the checksum-based keys 312 in expression cache 320. Such configuration may be based on a number of characters in a string (e.g., name, identifier, etc.) associated with a given expression being greater than a threshold length of threshold length check 316 (e.g., 32 characters, 64 characters, etc.). The checksum-based keys 312 may, for example, be generated via a hash algorithm, such as message digest algorithm 5 (MD), secure hash algorithm 256-bit (SHA-256), etc. In some aspects, such as when the number of characters associated with the given expression is less than or equal to the threshold length, expression compilation and caching 315 and/or expression compiler 310 may be configured to use direct key 317P by storing direct keys 313 in expression cache 320. Direct keys 313 may, for example, be the string associated with the given expression, such as a name or an identifier of the expression. This dual caching strategy represents a significant technical improvement because it can optimize cache key generation based on expression length, using efficient direct keys for short expressions and checksum-based keys for longer expressions to avoid key collision issues. The checksum-based keys may use message digest algorithm checksums to generate unique cache keys for longer expressions.

The matcher expression evaluation system 300 may include a batch evaluation subsystem 333, which may additionally include a batch evaluation engine 330 configured to process multiple matcher expressions in a single expression language context using batch evaluation to achieve improved performance compared to sequential evaluation. The multiple matcher expressions may be acquired by retrieving compiled expression(s) 320P from expression cache 320. As a technical feature, the batch evaluation may process multiple matcher expressions in parallel across multiple threads while maintaining a shared expression language context. This batch evaluation approach represents a significant technical improvement because it enables parallel processing of multiple expressions while sharing context, reducing overall evaluation time compared to sequential evaluation. In some aspects, batch evaluation engine 330 may be configured to identify and/or determine, based on configuration information, whether a plurality of matcher expressions are processed in parallel or sequentially. For example, a plurality of matcher expressions may be dependent on each other, and, in such scenarios, batch evaluation engine 330 may be configured to process the matcher expressions sequentially. Such optional configuration can be implemented to prevent redundancy and improve overall computational efficiency of system 100.

The matcher expression evaluation system 300 may support three matcher types. An askWhen matcher 340 may be implemented to determine qualification by evaluating whether a question can be shown at all based on session state. An askIf matcher 350 may be implemented to determine visibility by evaluating whether a question should be shown now based on current context. A contextUpdates matcher 360 may be implemented to determine post-answer behavior by evaluating what session state changes when a question is answered.

Expression language expressions 314 (e.g., matcher expressions, patterns, etc.), may include one or more conditions that, when evaluated, may perform one or more function calls, such as, for example, function calls on and/or within context object 410. In some aspects, expression language expressions 314 may perform evaluation of nested properties, such as nested properties of context object 410, via one or more patterns. Nested properties may be based on one or more data structure relational identifiers (e.g., indexing, pointers, edges, etc.). Patterns of expression language expressions 314 may include one or more conditions (e.g., Boolean expressions, inequalities, string matching, etc.). The one or more patterns may include macros corresponding to configurations defined at runtime, such as configurations received and/or retrieved from external systems. Expression language expressions 314 may be scripts to evaluate one or more patterns and/or execute one or more function calls. Expression language expressions 314 may be implemented a specific programming language and/or a specific type of programming language. For example, expression language expressions 314 may be implemented via an expression language or a plurality of expression languages (e.g., MVFLEX Expression Language (MVEL), Java® Expression Language (JEXL), Groovy™, etc.).

In some aspects, a particular technological problem concerning a lack of prior knowledge of a received data structure for runtime-configurable question-and-answer system 100 arises due to the domain-agnostic and schema-agnostic nature of system 100. Conventional attempts to remedy this technological problem may result in implementation of artificial intelligence (AI) and/or machine learning (ML), such as via a large language model (LLM), natural language processing (NLP), AI agents (e.g., AI chatbot). However, such conventional implementations may suffer from a lack of prior data (e.g., training data) to determine which question to present to a user. Particularly, due to the domain-agnostic and schema-agnostic implementation, a LLM-powered variant of system 100 would lack sufficient training data and examples when processing questions for a new external system with a new data structure and/or new set of questions, logic, etc. To remedy this lack of training data and/or prior knowledge, the aspects described herein utilize expression language expressions 314 received from external systems and implemented specifically for the external system's data structure, set of questions, logic, etc. Such aspects therefore require no prior knowledge, custom code, etc. to interface and properly process questions for new systems, new data, and/or new configurations.

In some aspects, AI/ML may be utilized to assist and/or support system 100. For example, an AI agent or AI chatbot may be implemented to handle general or generic interfacing and/or communication with an end-user operating a mobile device. For example, the aspects described herein may process questions for a specific service at the mobile device, and AI/ML may perform non-specific services, such as services and/or functions required for all users, all systems, all scenarios, etc. In some aspects, AI/ML may be utilized to assist with non-substantive portions of question and/or answer processing, such as, for example, fuzzy logic and/or spelling or grammar errors. Fuzzy logic may correspond to altering received input via one or more of case manipulation (e.g., upper case, lower case, etc.) and/or replacing words with similar or synonymous words for textual input. Spelling and/or grammar errors may correspond to identifying, modifying, and/or replacing misspelled words and/or grammatically incorrect phrases with correctly spelled words and/or grammatically correct phrases, respectively. Such AI/ML assistance would not alter the substantive processing of questions and/or answers, but, would instead assist and/or facilitate pattern matching based on generalized knowledge (e.g., spelling of words, grammar, etc.). Additionally, such aspects may be implemented due to a requirement for strict pattern matching, such as when case (e.g., uppercase or lowercase) of specific characters for a textual answer is evaluated.

During operation, expression language expressions 314 may be provided as input to the expression compiler 310 of expression compilation and caching 315 to perform the compiling expression 314P. The expression compiler 310 may compile the expressions and check the length against a threshold, such as via threshold length check 316. For expressions longer than the threshold, the expression compiler 310 may generate checksum-based keys 312. For expressions shorter than or equal to the threshold, the expression compiler 310 may use direct keys 313. The compiled expressions may be stored in the expression cache 320 using the appropriate key type (e.g., checksum-based keys 312 or direct keys 313).

When evaluation is needed, such as when matcher expression evaluation system 300 is configured to evaluation expression 318P, the batch evaluation engine 330 may retrieve compiled expressions from the expression cache 320 and evaluate them against the context object 410. The batch evaluation engine 330 may create a shared expression language context 331 and spawn parallel threads 332 to process multiple matcher expressions simultaneously. The batch evaluation engine 330 may process matchers, such as matcher types 334. Matcher types 334 may include, for example, one or more askWhen matchers 340, one or more askIf matchers 350, and/or one or more contextUpdates matchers 360, with each matcher type evaluating against the context object 410 to determine its respective output (output qualification 340P, output visibility 350P, output post-answer behavior 360P). The outputs may include question visibility, qualification, and post-answer behavior information. For example, such outputs may be combined and/or aggregated into question visibility, qualification, and post-answer behavior 362, which may be referred to as output 362 for simplicity's sake. In some aspects, data from context object 410 is received and/or retrieved by batch evaluation engine 330 and/or its parallel threads 332. The data from context object 410 may correspond to the matcher type of matcher types 334, such as, for example, data for evaluating qualification 410P for askWhen matcher 340, data for evaluating visibility 411P for askIf matcher 350, and/or data for determining updates 412P for contextUpdates matcher 360. Based on output 362, parallel threads 332 may return results 332P to batch evaluation engine 330.

A domain-agnostic evaluation engine 200 and matcher expression evaluation system 300 may be configured to evaluate matcher expressions against a context object. The domain-agnostic evaluation engine 200 and matcher expression evaluation system 300 may, in some aspects, implement one or more of the following steps in an algorithm. The domain-agnostic evaluation engine 200 and matcher expression evaluation system 300 may: (1) receive a matcher expression and a context object as input, where the context object contains session data, claim information, and prior answers; (2) check the expression cache 320 using a threshold-based key selection strategy, where expressions longer than a threshold length use checksum-based keys and expressions shorter than the threshold length use direct keys; (3) if a compiled expression exists in the cache, retrieve the compiled expression; if not, compile the expression using the expression compiler 310 to generate an executable form; (4) store the compiled expression in the expression cache 320 using the appropriate key type; (5) evaluate the compiled expression against the context object 410, where the evaluation may access nested properties and call functions within the context object; and/or (6) return the evaluation result, which may be a boolean value, a calculated value, or a state change indication.

A matcher expression evaluation system 300 may be configured to determine question visibility, qualification, and post-answer behavior. The matcher expression evaluation system 300 may, in some aspects, implement one or more of the following steps in an algorithm for each matcher type. For askWhen matchers 340, the matcher expression evaluation system 300 may: (1) receive a question definition and current session state as input; (2) evaluate the askWhen matcher expression against the session state using the context object 410; (3) if the evaluation returns true, determine the question qualifies to be shown; if false, determine the question does not qualify; (4) return the qualification result. For askIf matchers 350, the matcher expression evaluation system 300 may: (1) receive a question definition and current context as input; (2) evaluate the askIf matcher expression against the current context using the context object 410; (3) if the evaluation returns true, determine the question should be shown now; if false, determine the question should not be shown now; (4) return the visibility result. For contextUpdates matchers 360, the matcher expression evaluation system 300 may: (1) receive a question definition and the question's answer as input; (2) evaluate the contextUpdates matcher expression against the context object 410 with the new answer; (3) determine what session state changes should occur based on the evaluation result; (4) apply the determined state changes to update the session state; and/or (5) return the state change confirmation. Expression cache 320 may include metadata and/or properties associated with each stored key-value pair, wherein the metadata and/or properties define which of the matcher types 334 the pre-compiled expression value corresponds to. In some aspects, such correspondence is determined at run-time (e.g., runtime determination of what question to present next).

Figure 3:
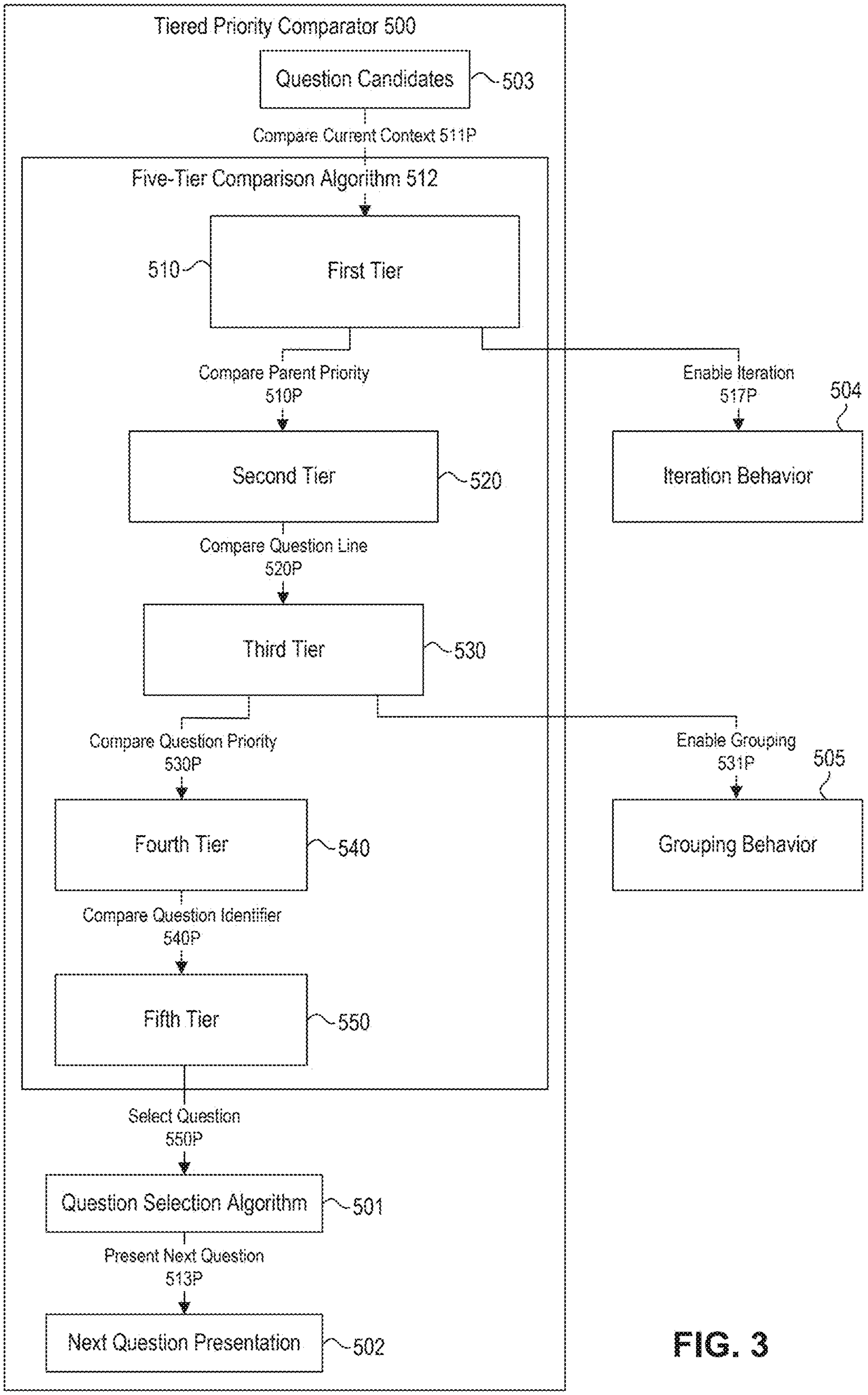
FIG. 3 illustrates a detailed view of the tiered priority comparator showing the five-tier comparison algorithm, in accordance with some aspects.

FIG. 3: Tiered Priority Comparator

FIG. 3 depicts a detailed view of the tiered priority comparator 500. The tiered priority comparator 500 and/or components depicted in FIG. 3 may be implemented by processing logic that can comprise hardware (e.g., circuitry, dedicated logic, programmable logic, microcode, etc.), software (e.g., instructions executing on a processing device), or a combination thereof. It is to be appreciated that not all components may be needed to perform the capabilities provided herein. The components of FIG. 3 shall be described with reference to FIGS. 1A-1B, 2A-2B, and 4-9. However, FIG. 3 is not limited to these example aspects. The tiered priority comparator 500 may be configured to determine question ordering through a multi-tier comparison algorithm that may enable both iteration behavior and grouping behavior. The tiered priority comparator 500 may receive question candidates 503, may include a five-tier comparison algorithm subsystem 512, may select question 550P via a question selection algorithm 501, and/or may present next question 513P via next question presentation 502. The tiered priority comparator 500 may enable iteration 517P, thereby triggering and/or causing an iteration behavior 504 and may enable grouping 531P, thereby triggering and/or causing a grouping behavior 505.

In some aspects, a plurality of questions lines are tracked and/or stored, such as in a database (not shown). Each question line may correspond to a specific set of properties and/or data, such as data stored in context object 410. As a non-limiting example, a first question line may correspond to an arm injury and a second question line may correspond to a car crash. In some aspects, question lines include hierarchical relations (e.g., parent, child, etc.). Continuing the non-limiting example, the first question line may be a child question line to the second question line, wherein, questions of the arm injury question line are presented (e.g., to an end-user operating a client device) after questions of the car crash question line are presented.

The five tiers of the five-tier comparison algorithm 512 represent an example ordering of priorities. Such ordering is not intended to be limiting and, in some aspects, the tiers are implemented in an order. For example, second tier 520 may be assigned a highest priority and first tier 510 may be assigned a second-highest priority. For simplicity's sake and as a non-limiting example, the explanation of the five-tier comparison algorithm 512 will be described with the first tier 510 having a highest priority, and decreasing priority for each successive tier. Priority may, in some aspects, correspond to weights to determine a next question. In alternative aspects, priority may correspond to an order of evaluation, wherein satisfaction of a threshold or requirement associated with the specific tier causes termination of algorithm 512, such as via short-circuit evaluation. In some aspects, when a tier's evaluation does not result in one or more sufficiently satisfied thresholds or requirements, algorithm 512 may route and/or continue to the next tier (e.g., next-highest priority).

The tiered priority comparator 500 may evaluate question candidates through five tiers of five-tier comparison algorithm 512. A first tier 510 may evaluate current context bias (e.g., compare current context 511P) as a highest priority. For example, first tier 510 may evaluate properties and/or nested properties of context object 410 to determine whether one or more question candidates of question candidates 503 should be presented. In some aspects, the first tier 510's current context evaluation may result in enabling iteration 517P, causing iteration behavior 504 to be triggered. As a technical feature, the first tier 510 may group questions with matching context values together, which may allow the system to ask the same question type across multiple entities. This iteration behavior represents a significant technical improvement because it may enable the system to efficiently collect the same type of information across multiple entities (such as asking about injuries for each body part) without requiring separate question definitions for each entity.

Referring back to and continuing the above example, a third question line corresponding to a neck injury may satisfy the current context comparison when, for example, the current context includes properties and/or metadata associated with the first arm injury question line. For example, each of the neck injury and the arm injury question line may include questions concerning x-rays of the injuries, and, the first tier 510 may determine these two questions from distinct question lines are contextually related. Such context comparison may be based on one or more context properties (e.g., tags, identifiers, etc.).

A second tier 520 may evaluate parent priority (e.g., compare parent priority 510P) to maintain question line hierarchy. The second tier 520 may maintain question line hierarchy by evaluating parent priority relationships between questions, which may ensure that parent-child question relationships are preserved in the ordering. Referring back to and continuing the above example, the second tier 520 may evaluate that the questions of the second car crash question line should be presented before the questions of the first arm injury question line. This evaluation may, for example, be based on a hierarchical parent-child relationship between the two question lines. Such evaluation may be performed via analysis of one or more relational properties (e.g., parent pointer, child identifier, parent node, etc.).

A third tier 530 may evaluate current question line bias (e.g., compare question line 520P). In some aspects, the third tier 530's current question line evaluation may result in enabling grouping 531P, causing grouping behavior 505 to be triggered. As a technical feature, the third tier 530 may allow questions with different contexts to group by current question line, which may allow the system to complete all questions for one entity before moving to the next entity. This grouping behavior represents a significant technical improvement because it may enable the system to complete all questions related to one entity (such as all questions about a specific injury) before moving to questions about the next entity, which may streamline question processing and improve data organization. In some aspects, triggering of grouping behavior 505 may cause processing of the entire question grouping (e.g., current question line). For example, five-tier comparison algorithm 512 may be skipped and/or bypassed until all questions of the current question line have been processed.

A fourth tier 540 may evaluate explicit question priority values assigned to questions (e.g., compare requestion priority 530P). The fourth tier 540 may use explicit priority values that may be configured for each question, which may provide fine-grained control over question ordering. For example, questions within question lines may include explicit priority values to determine ordering within a given question lines. In some aspects, questions across different question lines may be evaluated in an order based on the described explicit question priority values assigned to the questions.

A fifth tier 550 may evaluate question identifier as a deterministic tiebreaker (e.g., compare question identifier 540P). The fifth tier 550 may use question identifiers as a deterministic tiebreaker when all other tiers are equal, which may ensure consistent ordering even when multiple questions have identical priority values across the first four tiers. For example, question identifiers may be numerical or alphanumerical values assigned to and/or corresponding to each question.

During operation, question candidates 503 may be provided to the tiered priority comparator 500. The first tier 510 may compare current context 511P, which may group questions with matching context values together to enable iteration behavior. The second tier 520 may compare parent priority 510P to maintain question line hierarchy. The third tier 530 may compare question line 520P, which may allow questions with different contexts to group by current question line to enable grouping behavior. The fourth tier 540 may compare question priority 530P using explicit priority values. The fifth tier 550 may compare question identifier 540P as a deterministic tiebreaker.

The tiered priority comparator 500 may select question 550P based on the five-tier comparison algorithm 512 and/or question selection algorithm 501 and present next question 513P to the user. The five-tier comparison algorithm 512 and/or question selection algorithm 501 may enable both iteration behavior (where the same question type is asked across multiple entities) and grouping behavior (where all questions for one entity are completed before moving to the next entity) through the single unified multi-tier comparison approach. In some aspects, question selection algorithm 501 may utilize output from five-tier comparison algorithm 512 (e.g., outputs and/or evaluations from each tier) to select question 550P.

A tiered priority comparator 500 may be configured to determine question ordering through a multi-tier comparison algorithm. The tiered priority comparator 500 may implement one or more of the following steps in an algorithm (e.g., five-tier comparison algorithm 512). The tiered priority comparator 500 may: (1) receive question candidates as input, where each candidate has associated context values, parent priority relationships, question line information, explicit priority values, and question identifiers; (2) evaluate the first tier 510 by comparing current context bias 511P for each candidate, where questions with matching context values are grouped together to enable iteration behavior; (3) if multiple candidates remain after the first tier evaluation, evaluate the second tier 520 by comparing parent priority 510P to maintain question line hierarchy, where parent-child question relationships are preserved in the ordering; (4) if multiple candidates remain after the second tier evaluation, evaluate the third tier 530 by comparing current question line 520P, where questions with different contexts may group by current question line to enable grouping behavior; (5) if multiple candidates remain after the third tier evaluation, evaluate the fourth tier 540 by comparing question priority 530P using priority values assigned to questions; (6) if multiple candidates remain after the fourth tier evaluation, evaluate the fifth tier 550 by comparing question identifier 540P as a deterministic tiebreaker to ensure consistent ordering; (7) select the question 550P with the highest priority based on the five-tier evaluation and/or question selection algorithm 501; and/or (8) return the selected question at next question presentation 502 for presentation to the user.

Figure 4:
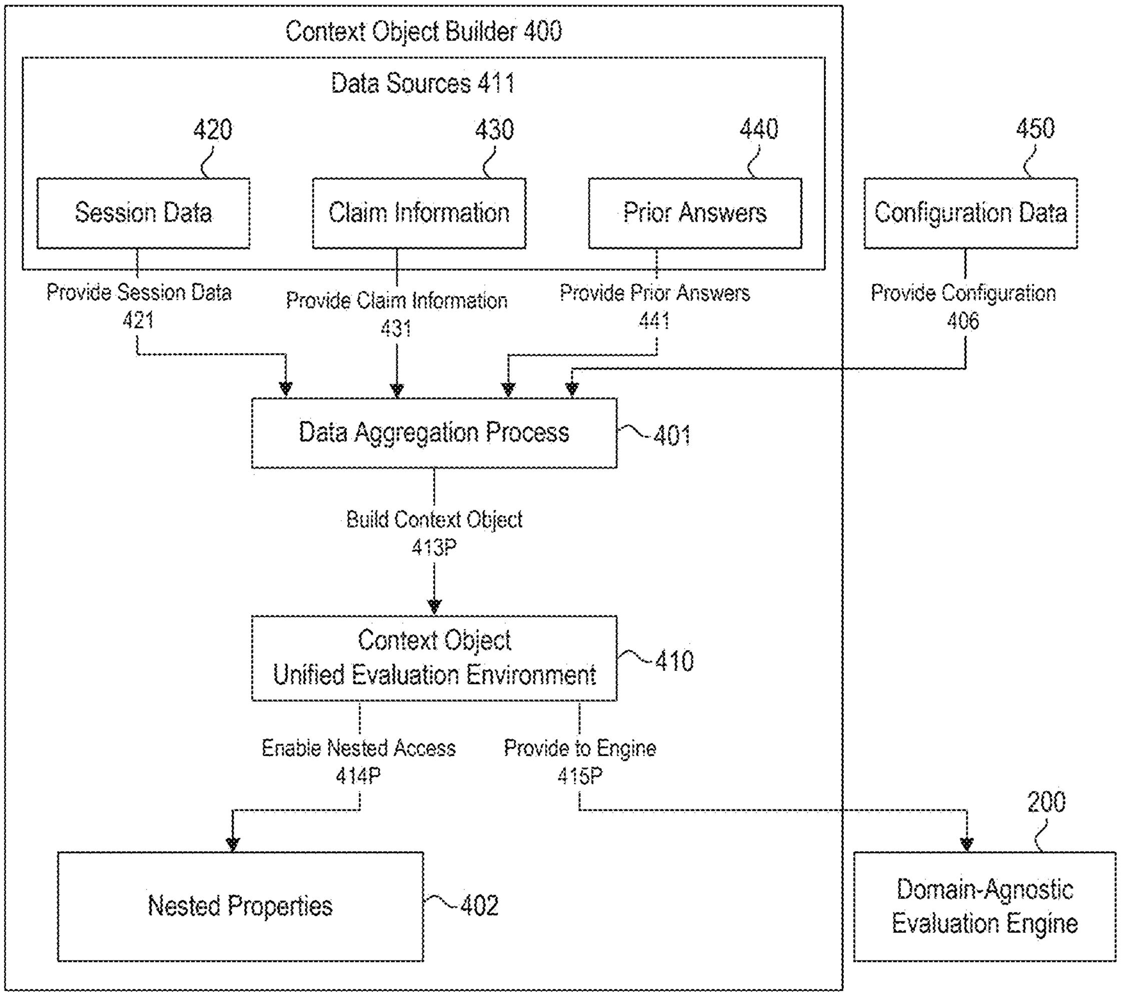
FIG. 4 illustrates a detailed view of the context object builder showing data aggregation from multiple sources, in accordance with some aspects.

FIG. 4: Context Object Builder

FIG. 4 depicts a detailed view of the context object builder 400. The context object builder 400 and/or components depicted in FIG. 4 may be implemented by processing logic that can comprise hardware (e.g., circuitry, dedicated logic, programmable logic, microcode, etc.), software (e.g., instructions executing on a processing device), or a combination thereof. It is to be appreciated that not all components may be needed to perform the capabilities provided herein. The components of FIG. 4 shall be described with reference to FIGS. 1A-1B, 2A-2B, 3, and 5-9. However, FIG. 4 is not limited to these example aspects. The context object builder 400 may be configured to build context object 410 from data sources 411, which may include, for example, session data 420, claim information 430, and/or prior answers 440, providing a unified evaluation environment. The context object builder 400 may include data sources 411 and a data aggregation process 401, and may provide access to nested properties 402 via context object 410.

The context object builder 400 may aggregate data from multiple sources. Session data 420 may provide session data 421, which may include a current session state including user responses, current context values, and/or session metadata. Claim information 430 may provide claim information 431, which may include claim-related data such as policy information, coverage details, and/or claim identifiers. Prior answers 440 may provide prior answers 441, which may include previously collected answers that may be referenced by subsequent questions. Configuration data 450 may provide configuration 406, which may include question definitions, matcher expressions, and/or system configuration. In some aspects, configuration data 450 may be received at runtime, such as upon receipt of a connection to a client device (e.g., login, authentication, claim report, etc.). For example, configuration data 450 may be received and/or retrieved from one or more data stores when a user logs into an application, such as, for example, during user session 130 of a front-end application corresponding to system 100. In some aspects, a plurality of configuration data 450 may be received and/or retrieved, each configuration data 450 corresponding to a question line or grouping of question lines. As a non-limiting example, each configuration data 450 may correspond to a specific domain, such as a car crash domain, an injury intake domain, etc.

The context object builder 400 may perform a data aggregation process 401 that may combine data from these multiple sources into a unified context object 410. As a technical feature, the context object 410 may provide a unified evaluation environment that may enable matcher expressions to, for example, access nested properties, perform calculations, and/or call functions across all aggregated data sources. In some aspects, context object 410 enables nested access 414P, such as access to nested properties 402 via the matcher expression implementation. This unified context approach represents a significant technical improvement because it may eliminate the need for matcher expressions to know about the underlying data source structure, which may simplify expression writing and may enable more powerful conditional logic. Additionally, the context object 410's matcher expression implementation provides the capability to receive configuration data 450 at runtime, which, in turn, leads to the domain-agnostic system 100 being runtime-configurable. Such an implementation enhances and/or improves upon conventional systems due to system 100 providing an architecture that is interoperable with runtime configurations without prior knowledge or additional infrastructure.

The context object 410 may enable nested property access, which may allow matcher expressions to access properties at any depth within the aggregated data. For example, a matcher expression may access nested properties organized in a hierarchical structure, such as accessing a property nested within multiple levels of parent objects, without needing to know how the data is structured across different sources. The context object 410 may also enable function calls, which may allow matcher expressions to call utility functions, such as for calculations, string manipulation, and/or data transformations.

During operation, session data 420 may provide session data 421 to the data aggregation process 401. Claim information 430 may provide claim information 431 to the aggregation process 401. Prior answers 440 may provide prior answers 441 to the aggregation process 401. Configuration data 450 may provide configuration 451 to the aggregation process 401. The data aggregation process 401 may build the context object 410, which may enable nested access 414P to nested properties 402 and may provide the context object 410 to the domain-agnostic evaluation engine 200.

A context object builder 400 may be configured to build a context object from session data, claim information, and prior answers. The context object builder 400 may, in some aspects, implement one or more of the following steps in an algorithm. The context object builder 400 may: (1) receive session data 420 as input, where session data includes current session state, user responses, current context values, and session metadata; (2) receive claim information 430 as input, where claim information includes policy information, coverage details, and claim identifiers; (3) receive prior answers 440 as input, where prior answers include previously collected answers that may be referenced by subsequent questions; (4) receive configuration data 450 as input, where configuration data includes question definitions, matcher expressions, and system configuration; (5) aggregate data from all sources into a unified data structure, where data from each source may be merged into a single context object 410; (6) enable nested property access within the context object 410, where properties may be accessed at any depth using dot notation or similar hierarchical access patterns; (7) enable function calls within the context object 410, where matcher expressions may call utility functions for calculations, string manipulation, or data transformations; and/or (8) provide the unified context object 410 as output to the domain-agnostic evaluation engine 200 for use in matcher expression evaluation.

Figure 5:
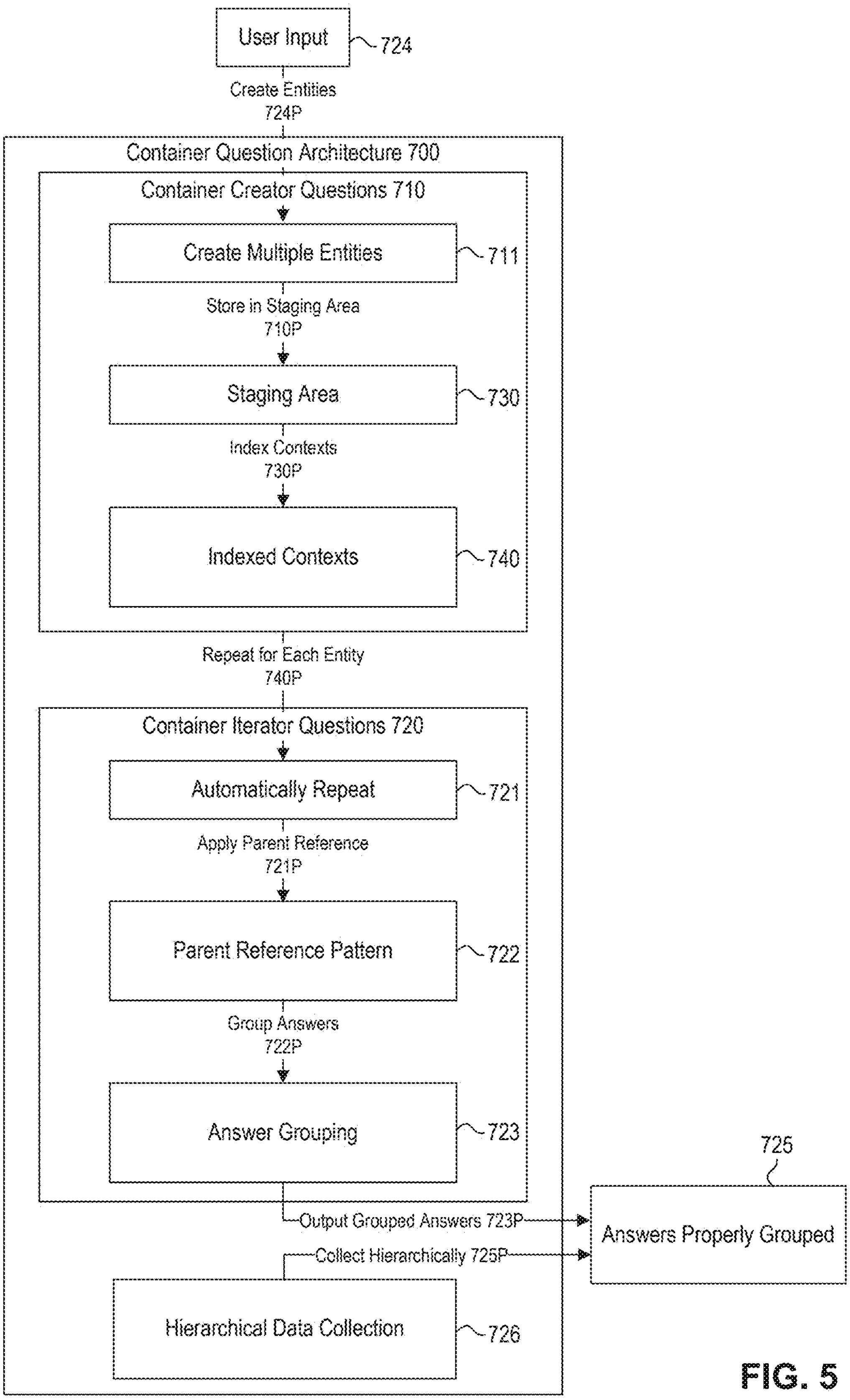
FIG. 5 illustrates a detailed view of the container question architecture showing container creator and iterator questions, in accordance with some aspects.

FIG. 5: Container Question Architecture

FIG. 5 depicts a detailed view of the container question architecture 700. The container question architecture 700 and/or components depicted in FIG. 5 may be implemented by processing logic that can comprise hardware (e.g., circuitry, dedicated logic, programmable logic, microcode, etc.), software (e.g., instructions executing on a processing device), or a combination thereof. It is to be appreciated that not all components may be needed to perform the capabilities provided herein. The components of FIG. 5 shall be described with reference to FIGS. 1A-1B, 2A-2B, 3-4, and 6-9. However, FIG. 5 is not limited to these example aspects. The container question architecture 700 may be configured to support container creator questions 710 that create multiple entities 711 stored in a staging area 730 with indexed contexts 740, and container iterator questions 720 that automatically repeat for each created entity, with answers properly grouped by iteration context. The container question architecture 700 may include container creator questions subsystem 710, create multiple entities component 711, container iterator questions subsystem 720, automatically repeat component 721, a parent reference pattern 722, answer grouping 723, hierarchical data collection 726, user input 724, and/or grouped answers 725.

The container question architecture 700 may include container creator questions 710 configured to create multiple entities. When a user, operating a client device, answers a container creator question, the system may create multiple entity instances (such as, for example, multiple injuries, multiple employers, or multiple vehicles) and store them in a staging area 730 with indexed contexts 740. Staging areas, as referenced throughout the specification, may be equated to a temporary and/or intermediate storage and/or data processing layer. Such staging areas can enable immediate access and/or contextual scoping of the staged data to perform one or more operations on and/or based on the data. As a technical feature, the indexed contexts 740 may, for example, be numeric strings or indices that may uniquely identify each entity instance. This indexed context approach represents a significant technical improvement because it may enable the system to automatically track and correlate answers with specific entity instances without requiring custom code for each scenario.

The container question architecture 700 may include container iterator questions 720 configured to automatically repeat for each created entity. Container iterator questions may reference their parent entities via a container context pattern that includes a parent identifier. As a technical feature, answers may be grouped by iteration context, which may ensure proper data correlation. This automatic iteration approach represents a significant technical improvement because it may enable the system to automatically ask the same questions for each created entity without requiring separate question definitions or custom iteration logic. Such a configuration may be utilized by question-and-answer system 100 to provide a dynamic framework that can service a plurality of domains, questions, and logic without requiring additional setup, testing, and/or compatibility requirements.

During operation, user input 724 may trigger the creation of multiple entities 711. The entities may be stored in the staging area 730, and indexed contexts 712 may be assigned to each entity. Container iterator questions 720 may automatically repeat for each entity 711, applying the parent reference pattern 722 and grouping answers 723 by iteration context. The grouped answers may be answers properly grouped 725, which may enable hierarchical data collection 726 without custom code.

The container question architecture 700 may enable automatic iteration for hierarchical data collection without requiring custom code for each scenario. For example, if a user indicates they have three injuries, the system 100, leveraging the components of container question architecture 700, may automatically create three injury entities and then ask questions about each injury (such as location, severity, treatment, etc.) for each of the three entities, with answers properly correlated to the correct injury entity.

A container question architecture 700 may be configured to create multiple entities using container creator questions. The container question architecture 700 may, in some aspects, implement one or more of the following steps in an algorithm. The container question architecture 700 may: (1) receive a user answer to a container creator question 710 as input 724; (2) parse the user answer to determine the number of entities to create, where the answer may indicate multiple instances (such as "three injuries" or a list of items); (3) for each entity to be created, generate a unique indexed context 740, where the indexed context may be a numeric string or index that uniquely identifies the entity instance; (4) create entity instances with their respective indexed contexts 740; (5) store the created entities in a staging area 730, where each entity is associated with its indexed context; and/or (6) return confirmation that entities have been created and stored.

A container question architecture 700 may be configured to automatically repeat container iterator questions for each created entity. The container question architecture 700 may, in some aspects, implement one or more of the following steps in an algorithm. The container question architecture 700 may: (1) retrieve all entities from the staging area 730 that were created by container creator questions; (2) for each entity in the staging area 730, identify container iterator questions 720 that should be repeated for that entity; (3) for each container iterator question 720, apply a parent reference pattern 722 that includes a parent identifier linking the iterator question to its parent entity; (4) repeat the container iterator question 720 for the entity 711, where the question is presented with the entity's indexed context; (5) collect answers to the iterator questions, where each answer is associated with the entity's indexed context through the iteration context; (6) group answers 723 by iteration context to ensure proper data correlation, where answers for the same entity are grouped together; and/or (7) output the properly grouped answers 725, where answers are properly correlated to their respective entity instances.

Figure 6:
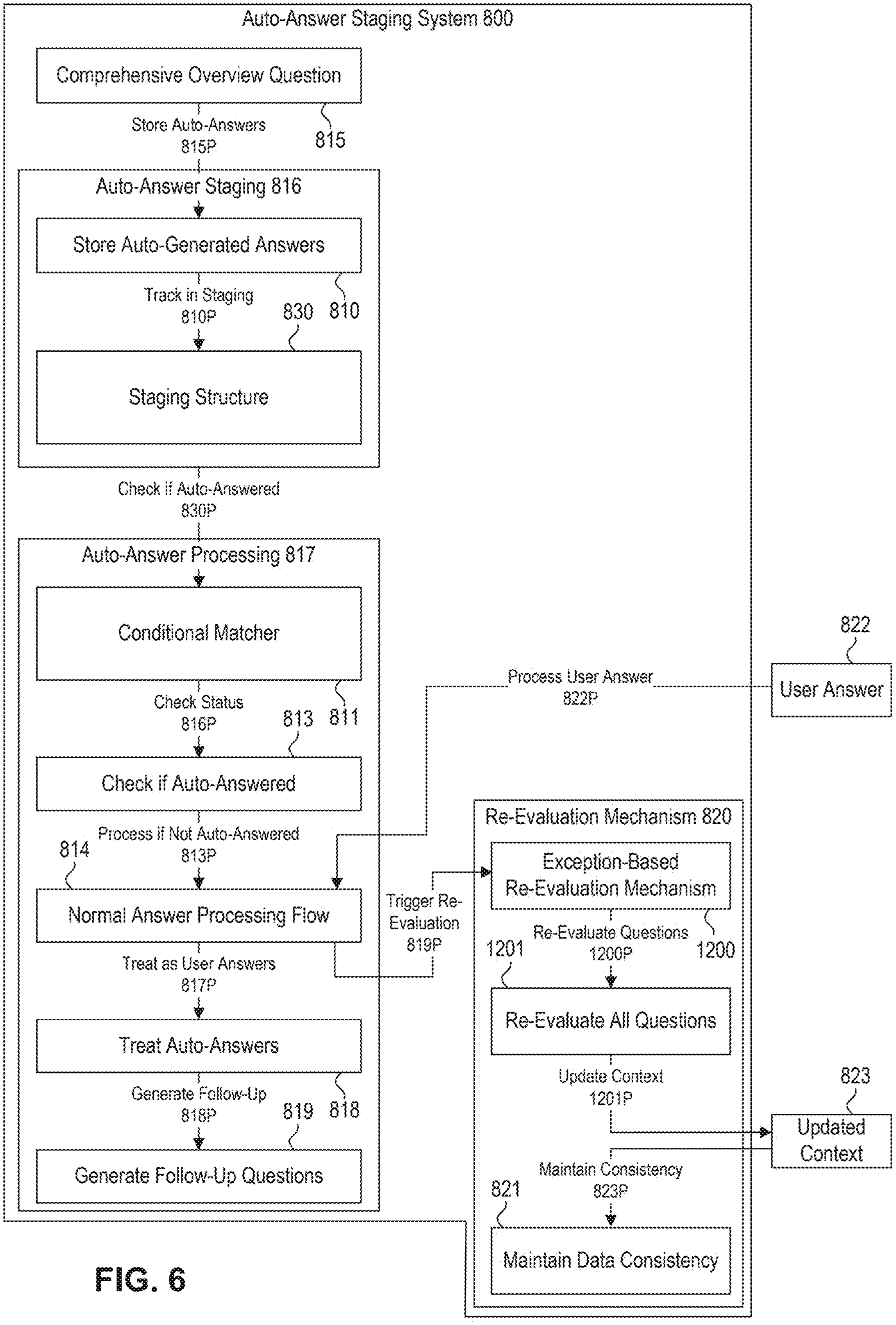
FIG. 6 illustrates a detailed view of the auto-answer staging system showing conditional matcher processing and re-evaluation, in accordance with some aspects.

FIG. 6: Auto-Answer Staging System

FIG. 6 depicts a detailed view of the auto-answer staging system 800. The auto-answer staging system 800 and/or components depicted in FIG. 6 may be implemented by processing logic that can comprise hardware (e.g., circuitry, dedicated logic, programmable logic, microcode, etc.), software (e.g., instructions executing on a processing device), or a combination thereof. It is to be appreciated that not all components may be needed to perform the capabilities provided herein. The components of FIG. 6 shall be described with reference to FIGS. 1A-1B, 2A-2B, 3-5, and 7-9. However, FIG. 6 is not limited to these example aspects. The auto-answer staging system 800 may be configured to store auto-generated answers in a staging area when users answer comprehensive overview questions, and process the staged auto-answers through a normal answer processing flow using a conditional matcher that may process questions only when they have not been auto-answered. The auto-answer staging system 800 may include a comprehensive overview question 815, an auto-answer staging subsystem 816, an auto-answer processing subsystem 817, conditional matcher component 811, treat auto-answers component 818, generate follow-up questions component 819, a re-evaluation mechanism subsystem 820, re-evaluate all questions component 1201, maintain data consistency component 821, user answer input 822, and/or updated context output 823.

The auto-answer staging system 800 may include a conditional matcher 811 configured to process questions only when they have not been auto-answered. In some aspects, conditional matcher 811 may be configured to bypass or skip questions based on the questions being auto-answered. When, for example, a user answers a comprehensive overview question (such as "Were you injured?" with "Yes, my head, neck, and back"), the system may automatically generate answers to related questions (such as "Was your head injured?" with "Yes", "Was your neck injured?" with "Yes", "Was your back injured?" with "Yes"). These auto-generated answers may be stored in a staging structure 830 that may track which questions have been processed.

As a technical feature, the conditional matcher 811 may ensure auto-answers are treated the same as user-provided answers and may generate any follow-up questions that may be needed. This auto-answer propagation approach represents a significant technical improvement because it may reduce interoperability issues, particularly due to the run-time-configuration, by automatically filling in related questions based on comprehensive answers, while still allowing the system 100 to generate appropriate follow-up questions based on the auto-answers.

The auto-answer staging system 800 may include an exception-based re-evaluation mechanism 1200 configured to ensure all questions are properly re-evaluated with updated context after auto-answers are processed, which may maintain data consistency across the question flow. As a technical feature, the exception-based re-evaluation mechanism 1200 may trigger re-evaluation of all questions when auto-answers are processed, which may ensure that question visibility and qualification are updated based on the new auto-answer data. This re-evaluation approach represents a significant technical improvement because it may maintain data consistency and may ensure that the question flow adapts correctly when auto-answers are introduced.

During operation, when a user answers a comprehensive overview question 815, auto-answer staging system 800, may store auto-generated answers 810 in the staging structure 830, which may track which questions have been processed. The conditional matcher 811 may check if questions have been auto-answered 813 and process them through the normal answer processing flow 814 only if they have not been auto-answered. Additionally and/or alternatively, conditional matcher 811 may skip and/or bypass processing of questions that have been auto-answered. Auto-answers may be treated as user-provided answers, such as at treat auto-answers 818, and follow-up questions 819 may be generated as needed (e.g., based on configuration data 450 corresponding to a question line that the auto-answered question is associated with).

When user answers, such as user answer 822, are processed 822P, the normal flow may trigger re-evaluation 819P through the exception-based re-evaluation mechanism 1200. The re-evaluation mechanism 820 may re-evaluate all questions 1200P with updated context 823 through the re-evaluate all questions component 1201, which may maintain data consistency 821 across the question flow.

An auto-answer staging system 800 may be configured to store auto-generated answers in a staging area when users answer comprehensive overview questions. The auto-answer staging system 800 may, in some aspects, implement one or more of the following steps in an algorithm. The auto-answer staging system 800 may: (1) receive a user answer to a comprehensive overview question as input, where the comprehensive overview question may ask about multiple related items (such as “Were you injured?” with answer “Yes, my head, neck, and back”); (2) parse the comprehensive answer to identify related specific questions that should be auto-answered, where the parsing may extract individual items from the comprehensive answer; (3) for each identified related question, generate an auto-answer based on the comprehensive answer (such as generating “Yes” for “Was your head injured?” when the comprehensive answer indicates head injury); (4) store each auto-generated answer in a staging structure 830, where the staging structure tracks which questions have been processed; (5) associate each auto-answer with its corresponding question identifier in the staging structure 830; (6) mark each processed question in the staging structure 830 to indicate it has been auto-answered; and/or (7) return confirmation that auto-answers have been stored.

An auto-answer staging system 800 may be configured to process the staged auto-answers through a normal answer processing flow using a conditional matcher. The auto-answer staging system 800 may, in some aspects, implement one or more of the following steps in an algorithm. The auto-answer staging system 800 may: (1) retrieve a question that needs to be processed from the question pool; (2) check the staging structure 830 using the conditional matcher 811 to determine if the question has been auto-answered 813; (3) if the question has not been auto-answered, process the question through the normal answer processing flow 814, where the normal flow may present the question to the user and wait for a user-provided answer; (4) if the question has been auto-answered, retrieve the auto-answer from the staging structure 830; (5) treat the auto-answer as a user-provided answer 817P, where the auto-answer is processed identically to how a user-provided answer would be processed; (6) generate any follow-up questions 819 that may be needed based on the auto-answer, where follow-up questions are determined using the same logic as for user-provided answers; (7) trigger re-evaluation 819P of all questions through the exception-based re-evaluation mechanism 1200 to ensure question visibility and qualification are updated based on the new auto-answer data; and/or (8) return confirmation that the auto-answer has been processed and follow-up questions have been generated if needed.

Figure 7:
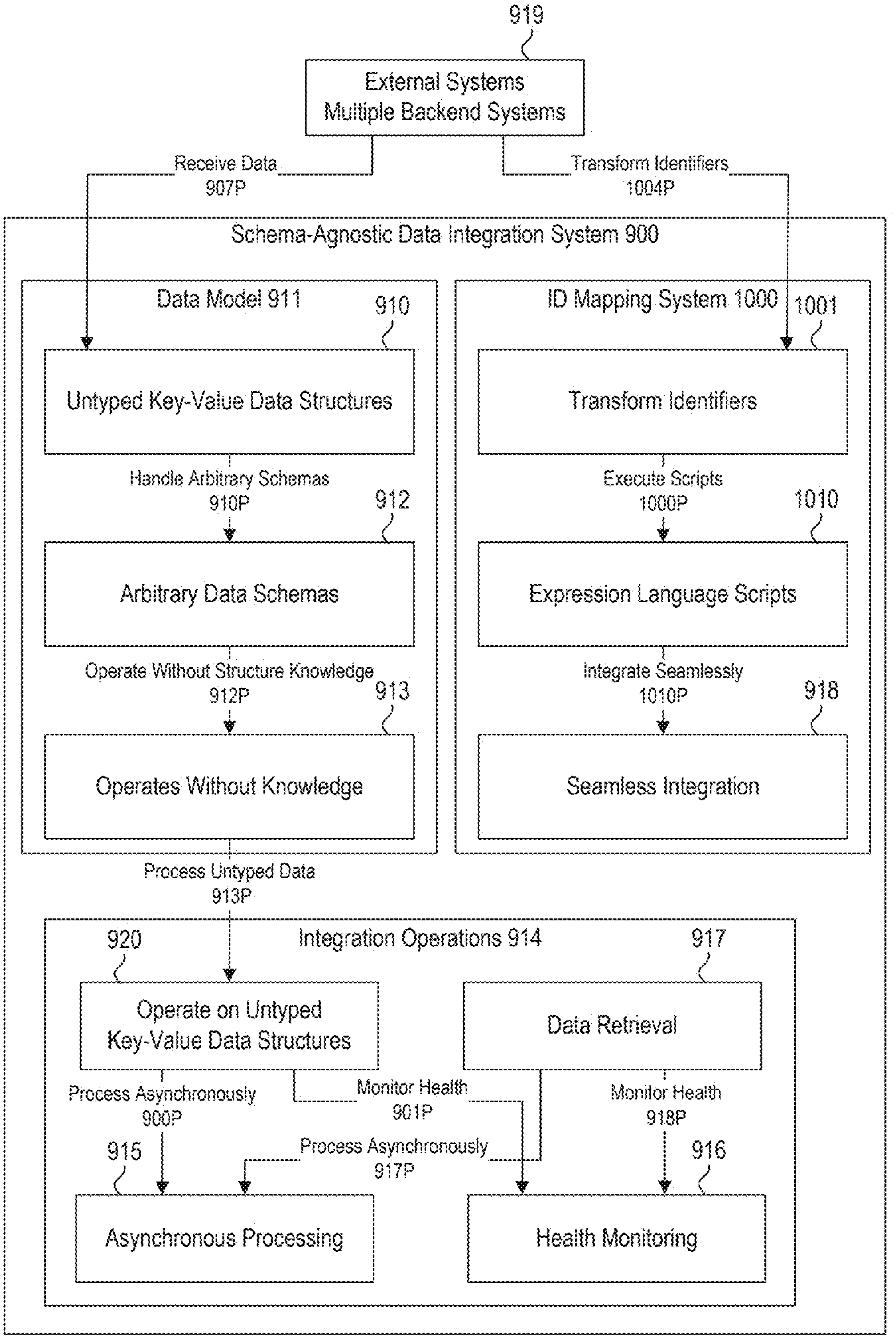
FIG. 7 illustrates a detailed view of the schema-agnostic data integration system showing untyped key-value data structures and ID (Identifier) mapping, in accordance with some aspects.

FIG. 7: Schema-Agnostic Data Integration System

FIG. 7 depicts a detailed view of the schema-agnostic data integration system 900. The schema-agnostic data integration system 900 and/or components depicted in FIG. 7 may be implemented by processing logic that can comprise hardware (e.g., circuitry, dedicated logic, programmable logic, microcode, etc.), software (e.g., instructions executing on a processing device), or a combination thereof. It is to be appreciated that not all components may be needed to perform the capabilities provided herein. The components of FIG. 7 shall be described with reference to FIGS. 1A-1B, 2A-2B, 3-6, and 8-9. However, FIG. 7 is not limited to these example aspects. The schema-agnostic data integration system 900 may be configured to operate on untyped key-value data structures rather than strongly-typed objects, which may enable operation on arbitrary data schemas from multiple external systems. The schema-agnostic data integration system 900 may include a data model subsystem 911, arbitrary data schemas component 912, operates without knowing structure component 913, an integration operations subsystem 914, asynchronous processing component 915, health monitoring component 916, data retrieval component 917, seamless integration component 918, ID mapping system 1000, expression language scripts 1010, and/or external systems input 919.

In some aspects, each of external systems 919 correspond to a question line and/or a group of question lines. For example, each of external systems 919 may provide, via the received data 907P and/or transform identifiers 1004P, configuration data 450. Such configuration data 450, as described herein, may include question data, matcher expressions, and/or additional system configuration information. In some aspects, such configuration data 450 includes at least one untyped key-value data structure 910 for facilitating schema-agnostic support of system 100.

The schema-agnostic data integration system 900 may operate on untyped key-value data structures 910 rather than strongly-typed objects. Such operation may enable the system 100 to receive and process arbitrary data schemas from multiple external systems without requiring additional code (e.g., for formatting, transforming, conversion, etc.). For example, schema-agnostic data integration system 900, via the untyped key-value data structure operation and due to a lack of restrictions and/or requirements of strong-typing, can operate on arbitrary data schemas, as they are received. The untyped key-value data structures may be implemented as a hybrid of strong and weak typing. For example, the key may be strongly typed as a string or character array whereas the value may be weakly typed (e.g., object) or undefined. In some aspects, the key-value data structures 910 are entirely weakly type, such as, for example, when key and value are both weakly typed (e.g., object). As a technical feature, the system may operate without knowing the specific structure of the data it processes, which may enable operation on arbitrary data schemas from multiple external systems. This schema-agnostic approach represents a significant technical improvement because it may reduce or eliminate the need for code changes when integrating with new backend systems or when backend systems change their data schemas. Conventional systems, relying on and/or requiring strong-typing, would, under the described implementation, fail (e.g., error, throw exception, etc.) at compile-time due to the weak-typing. And, if receiving the untyped key-value data structures 910, would fail (e.g., error, throw exception, etc.) at run-time. This is because conventional systems lack the domain-agnostic, schema-agnostic implementation of system 100, described herein, and therefore, conventional systems lacked the dynamic and flexible framework provided via the various components described herein, such as schema-agnostic data integration system 900.

The schema-agnostic data integration system 900 may orchestrate data retrieval 917 from different sources with asynchronous processing 915 and/or health monitoring 916. The schema-agnostic data integration system 900 may retrieve data from multiple external systems 919, handle arbitrary schemas 910P, and operate without structure knowledge 912P. The schema-agnostic data integration system 900 may process untyped data 913P by operating on untyped key-value data structures 920 via asynchronous processing 915 and/or health monitoring 916 to ensure reliable integration.

The schema-agnostic data integration system 900 may include an ID mapping system 1000 configured to transform identifiers 1001 between systems using configurable expression language scripts 1010. As a technical feature, the expression language scripts 1010 may be model view expression language scripts implemented via an expression language (e.g., MVFLEX Expression Language (MVEL), Java® Expression Language (JEXL), Groovy™, etc.). The expression language scripts may enable seamless integration with multiple backend systems by transforming identifiers 1001 from one system's format to another. In some aspects, a plurality of expression languages may be supported. In some aspects, each of the expression languages that are supported may further support untyped or weakly-typed data. This configurable ID mapping approach represents a significant technical improvement because it may enable the system to integrate with multiple backend systems that use different identifier formats without requiring code changes.

During operation, external systems 919 may receive data 907P and route the data to the schema-agnostic data integration system 900. The schema-agnostic data integration system 900 may receive data 907P, handle arbitrary schemas 910P, and operate without structure knowledge 912P. The system may process the untyped key-value data structures 910 asynchronously 900P and monitor health 901P. The ID mapping system 1000 may transform identifiers 1004P between systems using expression language scripts 1010, executing the scripts 1000P, which may integrate seamlessly 1010P with multiple backend systems. The transform identifiers process 1004P may enable the transformation of identifiers between different systems.

A schema-agnostic data integration system 900 may be configured to operate on untyped key-value data structures rather than strongly-typed objects. The schema-agnostic data integration system 900 may, in some aspects, implement one or more of the following steps in an algorithm. The schema-agnostic data integration system 900 may: (1) receive data 907P from an external system as input, where the data may have an arbitrary schema that is unknown to the system; (2) parse the received data 907P into untyped key-value pairs, where each key-value pair represents a data field and its value without requiring knowledge of the data structure; (3) store the key-value pairs in a data structure 910 that supports arbitrary data schemas 912, where the structure may be a map, dictionary, or similar key-value storage mechanism; (4) process the untyped key-value data structures 910 asynchronously via asynchronous processing 915, where processing may include data transformation, validation, or integration operations without requiring type information; (5) monitor the health of the data integration process via health monitoring 916, where health monitoring may track processing status, error conditions, or performance metrics; (6) enable access to the data through key-based lookups, where any key in the data structure may be accessed without prior knowledge of the schema; and/or (7) return the processed data or integration status as output.

An ID mapping system 1000 may be configured to transform identifiers 1001 between systems using configurable expression language scripts. The ID mapping system 1000 may, in some aspects, implement one or more of the following steps in an algorithm. The ID mapping system 1000 may: (1) receive an identifier from a source system as input, where the identifier may be in a format specific to the source system; (2) load a configurable expression language script 1010 that corresponds to the transformation needed between the source system and a target system; (3) execute the expression language script 1010 with the source identifier as input, where the script may perform calculations, string manipulations, or format conversions; (4) apply the script's transformation logic to convert or transform the identifier from the source system's format to the target system's format; (5) validate the transformed identifier 1001 to ensure it meets the target system's format requirements; and/or (6) return the transformed identifier 1001 as output, where the transformed identifier may be used for integration with the target system.

Figure 8:
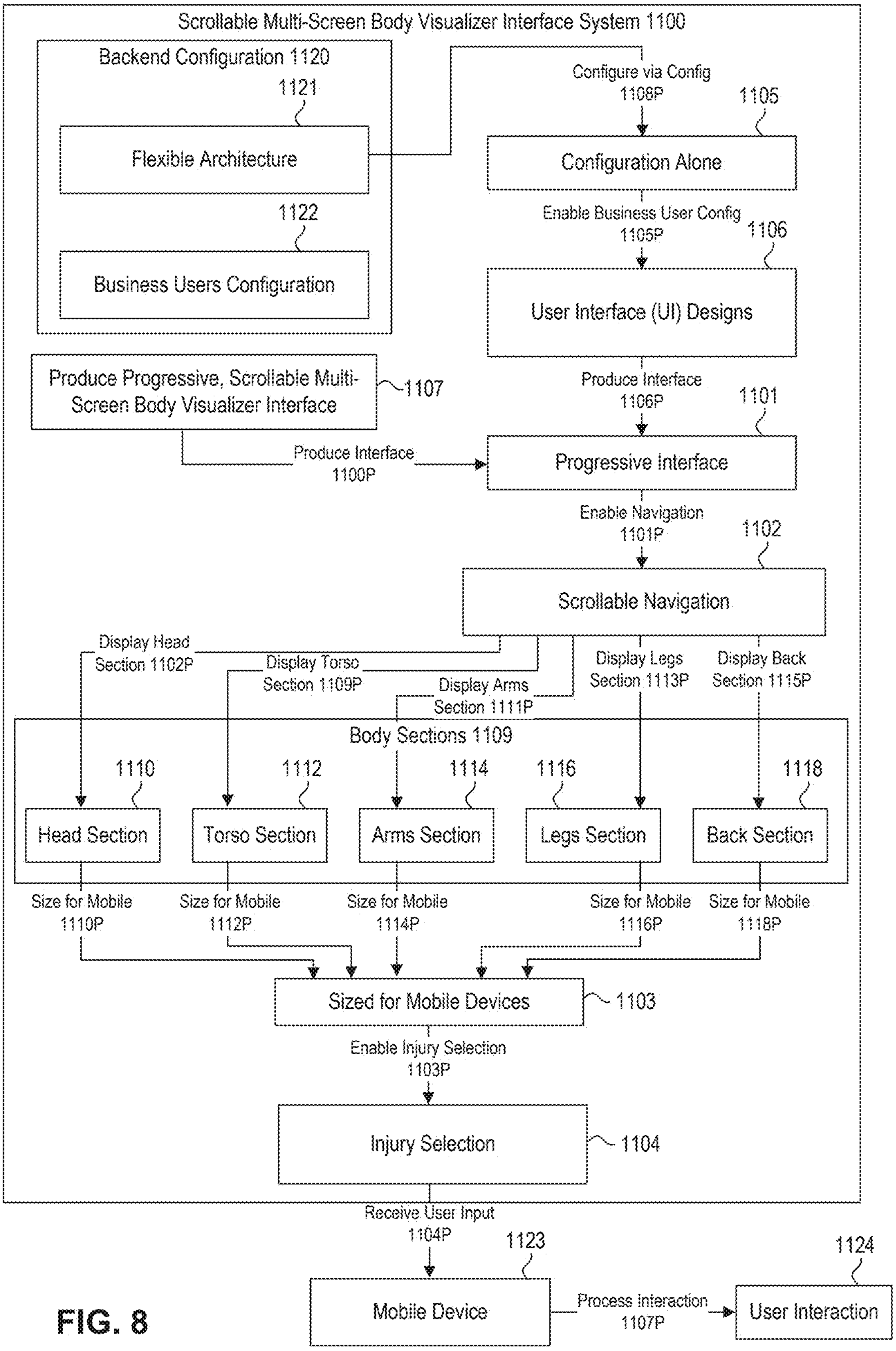
FIG. 8 illustrates a detailed view of the scrollable multi-screen body visualizer interface showing progressive scrolling with body sections, in accordance with some aspects.

FIG. 8: Scrollable Multi-Screen Body Visualizer Interface

FIG. 8 depicts a detailed view of the scrollable multi-screen body visualizer interface system 1100. The scrollable multi-screen body visualizer interface system 1100 and/or components depicted in FIG. 8 may be implemented by processing logic that can comprise hardware (e.g., circuitry, dedicated logic, programmable logic, microcode, etc.), software (e.g., instructions executing on a processing device), or a combination thereof. It is to be appreciated that not all components may be needed to perform the capabilities provided herein. The components of FIG. 8 shall be described with reference to FIGS. 1A-1B, 2A-2B, 3-7, and 9. However, FIG. 8 is not limited to these example aspects. The scrollable multi-screen body visualizer interface system 1100 may be configured to produce a progressive, scrollable multi-screen body visualizer interface that may enable users to identify and select specific body parts where injuries occurred, optimized for mobile devices with finger-based interaction. The scrollable multi-screen body visualizer interface system 1100 may include a produce progressive scrollable multi-screen body visualizer interface component 1107, a progressive interface component 1101, scrollable navigation component 1102, sized for mobile devices component 1103, injury selection component 1104, configuration alone component 1105, user interface (UI) designs component 1106, a body sections subsystem 1109, a backend configuration subsystem 1120, flexible architecture component 1121 that powers different body visualizer versions, business users configuration component 1122, mobile device input 1123, and/or user interaction output 1124. Scrollable multi-screen body visualizer interface system 1100 is described herein as an example front-end implementation of the described system 100. Such description is intended as a non-limiting example, and additional front-end implementations and/or connections top system 100 may be implemented in a similar or same fashion. For example, a scrollable multi-screen car interface system may be implemented for identifying parts of a car, such as parts of a car damaged in a car crash.

Client devices and/or mobile devices (e.g., mobile device 1103), as referenced herein, may be implemented as any computing device capable of accessing an application (e.g., web application, browser-based application, native application, etc.), which can include desktop computers, laptops, tablets, smartphones, smart watches, wearable technology, etc.

The scrollable multi-screen body visualizer interface system 1100 may produce a progressive interface 1101 that may allow users to navigate through different body sections by scrolling. The interface may include multiple body sections, such as, for example, a head section 1110, a torso section 1112, an arms section 1114, a legs section 1116, and a back section 1118. As a technical feature, each section may be displayed at an optimal size for accurate finger-based clicking on mobile devices. This progressive scrolling approach represents a significant technical improvement because it may enable users to accurately select specific body parts on mobile devices where screen space is limited, by displaying each body section at an optimal size rather than trying to fit the entire body on a single screen. For example, body sections may be zoomed in on based on answers received from an end-user operating a client device.

The scrollable multi-screen body visualizer interface system 1100 may be powered by a flexible architecture 1121 that may enable different body visualizer versions through configuration alone 1105. The flexible architecture 1121 may power different body visualizer versions, enabling the system to support various visual representations of the body visualizer. As a technical feature, business users may configure and deploy different user interface designs 1106 without code changes through the business users configure and deploy different UI designs component 1122. Such flexible architecture, such as the flexible framework provided by schema-agnostic data integration system 900, may enable the system 100 to receive and power deployment of different user interface designs 1106 without requiring additional code (e.g., for formatting, transforming, conversion, etc.). For example, schema-agnostic data integration system 900, via the untyped key-value data structure operation and due to a lack of restrictions and/or requirements of strong-typing, can facilitate, via configuration alone, deployment of different user interface designs 1160, as they are received. This configuration-driven approach represents a significant technical improvement because it may enable rapid iteration on user interface designs and may support different body visualizer versions (such as front view, back view, or detailed anatomical views) without requiring computational resources associated with conventional testing and/or deployment. The backend configuration subsystem 1120 may provide the configuration infrastructure that enables this flexible architecture 1121.

During operation, the interface 1101 may be produced, which may enable scrollable navigation 1102 through different body sections. Users may navigate to the head section 1110, torso section 1112, arms section 1114, legs section 1116, or back section 1118. Each section may be sized for mobile devices 1103, which may enable injury selection 1104 through finger-based interaction. The flexible architecture may configure the interface 1101 via configuration alone 1105, which may enable business users to configure and deploy different UI (User Interface) designs 1106 without code changes.

In some aspects, progressive interface 1101 may be produced via one or more vector image files, such as, as non-limiting examples, scalable vector graphics (SVG) files, portable document format (PDF) files, etc. For example, each of body sections 1109 may be a SVG file. Alternatively, each of body sections 1109 may be a portion or section of a single SVG file. In some aspects, a first plurality of the body sections 1109 correspond to and/or are included in a first SVG file and a second plurality of the body sections 1109 correspond to and/or are included in a second SVG file. Scrollable multi-screen body visualizer interface system 1100 and/or backend configuration 1120 may leverage SVG formatting capabilities, particularly SVG scaling and resolution-independence to enhance and/or improve zooming in on particular body sections of body sections 1109. In some aspects, an area of an SVG image may be defined as a path. For example, each of body sections 1109 may be defined as paths. And, based on a given context and/or presented question, one or more of the defined paths may be "clickable," such as via a touch-based interface on a mobile device. System 100 may, in some aspects, be configured to receive and/or identify a "clicked" path as an answer to a question presented to a user. In some aspects, various paths may be defined in a SVG image, but, based on a current context, only a subset of the defined paths may be "clickable." For example, body parts of head section 1110 (e.g., ear, nose, eye, etc.) may be defined paths, but, based on a prior answer of an injury to the arm, only arm paths (e.g., hand, bicep, wrist, etc.) may be "clickable." In some aspects, properties of paths may be updated and/or modified based on one or more answers to one or more questions and/or whether a path is "clickable." With reference to the previous example, the defined arm paths, based on the example prior answer, may be shaded and/or highlighted in a different color from other paths (e.g., "non-clickable" paths). The described SVG implementation provides a particular technical improvement for runtime-configuration of the question-and-answer system 100. By providing configurable "paths," associated with SVG files, system 100 can display, at a user interface, visual depictions corresponding to a given context and/or presented question that is both domain-agnostic and runtime-configurable. Particularly, vector image files provide additional runtime configuration capabilities, permitting zoom capabilities without sacrificing "clickable" paths, capabilities that are lacking in conventional systems, such as systems relying on raster image file formats.

In some aspects, scrollable multi-screen body visualizer interface system 1100 is implemented for an application, such as a browser application, native mobile application, desktop application, etc. Similar to the touch or finger-based description, such application implementation may leverage capabilities corresponding to the device running the application (e.g., computer, laptop, tablet, phone, wearable technology, etc.). Accordingly, runtime-configurable question-and-answer system 100 provides an architecture/framework that can be implemented with a variety of front-end applications, running on a variety of different device platforms.

Figure 9:
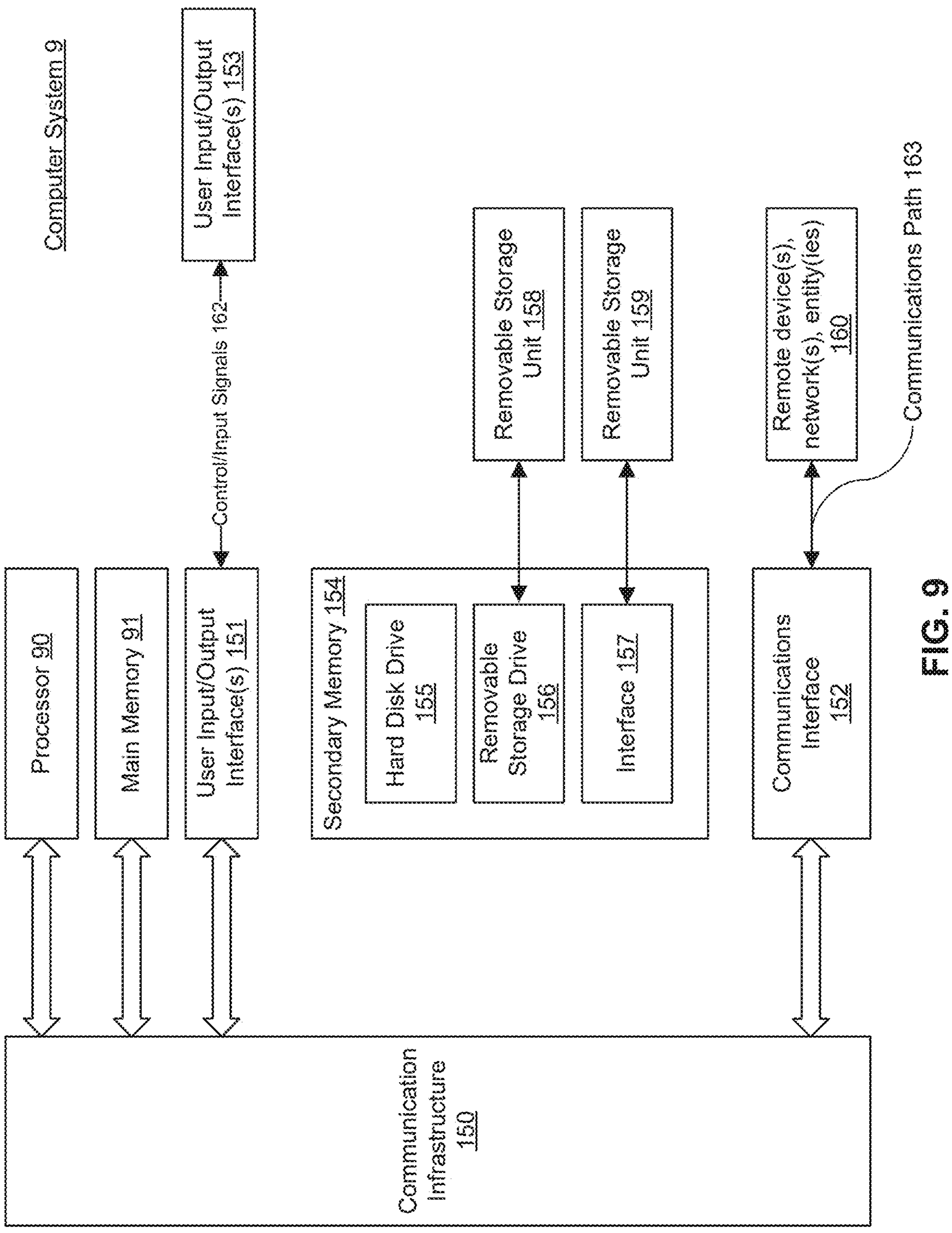
FIG. 9 illustrates a hardware diagram showing the computer system components, in accordance with some aspects.

FIG. 9: Hardware Diagram

FIG. 9 depicts a computer system 9 on which aspects of the present disclosure can be practiced. The computer system 9 may include one or more hardware processors 90 communicatively coupled to a main memory 91 and to a communication infrastructure 150. The main memory 91 may be configured to store, on at least a non-transitory computer-readable storage medium as described in greater detail below, executable program code.

The hardware processor 90 may include multiple hardware processors and/or multiple processor cores. The hardware processor 90 may include hardware processors from different devices that cooperate. The computer system 9 may execute one or more basic instructions included in the executable program code stored in main memory 91.

The relationship between the executable program code in the main memory 91 and the hardware processor 90 is structural; the executable program code is provided to the hardware processor 90 by imparting various voltages at certain times across certain electrical connections, in accordance with binary values in the executable program code, to cause the hardware processor to perform some action.

The executable program code in the main memory 91 may include the domain-agnostic evaluation engine 200, the matcher expression evaluation system 300, the context object builder 400, the tiered priority comparator 500, the dynamic question pool manager 600, the container question architecture 700, the auto-answer staging system 800, the schema-agnostic data integration system 900, the ID mapping system 1000, the scrollable multi-screen body visualizer interface system 1100, and the exception-based re-evaluation mechanism 1200.

The communication infrastructure 150 may provide bidirectional communication with the hardware processor 90, main memory 91, user input/output interfaces 151, secondary memory 154, and communications interface 152.

The computer system 9 may include user input/output interfaces 151 that control user input/output devices 153 through control/input signals 162. The computer system 9 may include a communications interface 152 that provides a communications path 163 to remote devices, networks, or entities 160.

The computer system 9 may include secondary memory 154 that may include a hard disk drive 155, a removable storage drive 156, and an interface 157. The removable storage drive 156 may access removable storage units 158, and the interface 157 may access removable storage units 159.

Problems with Conventional Approaches

Conventional question-and-answer systems may suffer from several technical limitations that are further detailed in the Background section. From a technical architecture perspective, such systems may require hard-coded question logic embedded in application code, may be tightly coupled to specific data schemas, may lack efficient mechanisms for collecting hierarchical data structures, and may not efficiently propagate answers from comprehensive questions to related specific questions. The technical problems described are rooted in computer technology due to a lack of runtime configuration capabilities, caused by specific interoperability requirements of conventional computer systems. Specifically, conventional implementations require testing and reconfiguration prior to deployment of a computer system to ensure interoperability with a single specific domain and/or specific schema. These strict technical requirements are needed in conventional systems because otherwise deployed code may malfunction, throw errors/exceptions, stall, and/or lead to arbitrary or unpredictable computer output. Therefore, conventional computer systems, particularly conventional question-and-answer implementations, are only interoperable with previously configured domains and schemas. And, accordingly, there lacks a technical capability in computer systems for domain-agnostic and/or schema-agnostic runtime configuration for a pre-built and/or deployed computer system, environment, or platform.

Solutions

Certain configurations described herein may provide a runtime-configurable question-and-answer system that addresses these technical limitations through several technical solutions. The domain-agnostic evaluation engine 200 may evaluate matcher expressions against a context object, enabling runtime configuration. The schema-agnostic data integration system 900 may operate on untyped key-value data structures, enabling integration with multiple backend systems. The container question architecture 700 may automatically handle hierarchical data collection through container creator and iterator questions, reducing the need for custom code. The auto-answer staging system 800 may automatically propagate answers from comprehensive questions to related specific questions, reducing user burden while maintaining data consistency.

Technical Approaches

The system may implement several technical approaches to achieve these improvements. The matcher expression evaluation system 300 may use expression language compilation and caching with a threshold-based dual caching strategy to optimize performance. The tiered priority comparator 500 may use a five-tier comparison algorithm to enable both iteration and grouping behaviors through a single unified approach. The context object builder 400 may aggregate data from multiple sources into a unified evaluation environment that enables nested property access and function calls. The batch evaluation engine 330 may process multiple matcher expressions in parallel across multiple threads while maintaining a shared expression language context.

Detailed Technical Improvements

The runtime-configurable question-and-answer system 100 provides several technical improvements to computer functionality and technology that integrate any abstract concepts into practical applications:

Domain-Agnostic Architecture Improves Computer System Flexibility

The domain-agnostic evaluation engine 200 and matcher expression evaluation system 300, in combination, may eliminate hard-coded logic from application code, enabling the computer system to operate across different domains. Specifically, the matcher expression evaluation system 300 may provide the pre-compilation, storage, and/or threads for evaluation engine 200 to evaluate domain-agnostic context, questions, and/or system configuration data. Through this combination, system 100 is capable of receiving runtime configurations and performing expression evaluation without reliance on hard-coded logic, such as hard-coded logic required in conventional systems. This architectural improvement addresses the technical problem of tightly-coupled software systems that require full software development lifecycle (coding, testing, deployment) for any business logic modification. The system may function as a pure evaluation engine that loads configuration data at runtime, which may reduce or eliminate the need for code deployment when questions, ordering, or conditional logic change.

This may improve computer system flexibility, may reduce deployment overhead, and may enable multi-tenant operation without code duplication, directly improving how computer systems handle logic configuration. Moreover, the runtime configuration provides a particular solution enabling universal compatibility with deployed and/or pre-built computer platforms.

Five-Tier Priority Comparator Algorithm Improves Question Ordering Efficiency

The tiered priority comparator 500 may implement a specific five-tier comparison algorithm that may enable both iteration behavior and grouping behavior through a single unified approach. This specific algorithm may improve computer functionality by providing concrete technical rules for how the computer may evaluate and compare question candidates: a first tier may evaluate current context bias to enable iteration, a second tier may evaluate parent priority to maintain hierarchy, a third tier may evaluate question line bias to enable grouping, a fourth tier may evaluate explicit priority, and a fifth tier may use question identifiers as a tiebreaker. This algorithm may enable the computer system to efficiently support both asking the same question type across multiple entities and completing all questions for one entity before moving to the next, without requiring separate algorithms or custom code for each behavior pattern. The specific tiered approach may improve computer processing efficiency compared to naive sorting approaches. Additionally, the tiered priority comparator 500 provides context-aware prioritization that is both consistent and accurate, thereby ensuring the domain-agnostic, schema-agnostic implementation does not sacrifice performance to achieve its runtime configurability.

Batch Evaluation with Parallel Processing Improves Computer Performance

The batch evaluation engine 330 may process multiple matcher expressions in parallel across multiple threads while maintaining a shared expression language context. This specific technical implementation may improve computer performance by reducing overall evaluation time compared to sequential evaluation. The parallel processing with shared context may represent a concrete technical mechanism that may improve computer processing efficiency, not merely using a computer to perform abstract evaluation steps.

Threshold-Based Dual Caching Strategy Optimizes Memory Usage

The expression cache 320 may use a threshold-based dual caching strategy that may optimize cache key generation based on expression length. Expressions longer than a threshold may use checksum-based keys generated by message digest algorithms, while shorter expressions may use direct keys. This specific optimization strategy may improve computer memory efficiency by using the most efficient key type for each expression length, which may avoid key collision issues while minimizing memory overhead. This may represent a concrete technical solution to cache key generation optimization. Additionally, the expression cache 320 may facilitate caching of pre-compiled expressions, such as expressions evaluated by domain-agnostic evaluation engine 200. And, such caching may generate multiplicative and/or exponential computational efficiencies. For example, expression cache 320 may reduce real-time responses from a millisecond-level to a microsecond-level, providing 1000× faster outputs and/or responses.

Unified Context Object Improves Data Processing Efficiency

The context object builder 400 may aggregate data from multiple sources into a unified evaluation environment that may enable matcher expressions to access nested properties and perform calculations without knowing underlying data source structure. This may improve computer functionality by eliminating the need for multiple data source lookups and simplifying expression writing. The unified context may enable the computer to process data more efficiently by aggregating once rather than requiring multiple queries across different sources.

Schema-Agnostic Data Integration

The schema-agnostic data integration system 900 may operate on untyped key-value data structures rather than strongly-typed objects, which may enable operation on arbitrary data schemas from multiple external systems. The system may be configured to reduce or eliminate code changes for new integrations. This architectural improvement addresses the technical problem of tightly-coupled data schemas that require code modifications for each new back-end system integration. The system may operate without knowing the specific structure of the data it processes, which may enable the computer to function as a universal integration layer that may adapt to different data schemas automatically. The schema-agnostic data integration system 900 therefore provides a technical solution that overcomes a problem specifically arising in the realm of computer systems, particularly addressing the lack of runtime-configuration capabilities and conventional reliance on hard-coded, static implementations. And, through the schema-agnostic data integration system 900, the runtime-configurable question-and-answer system 100 can provide processing and/or operation on arbitrary data schemas from multiple external systems without additional code or custom code, thereby addressing a fundamental problem of computer interoperability, particularly between two computer systems, platforms, and/or applications that have not previously been integrated with each other.

Container Question Architecture Automates Hierarchical Data Collection

The container question architecture 700 may automatically handle hierarchical data collection through container creator questions that may create multiple entities with indexed contexts and container iterator questions that may automatically repeat for each entity. This may eliminate the need for custom code for each hierarchical data scenario, which may improve computer system maintainability. The indexed context system may enable the computer to efficiently track and correlate answers with specific entity instances, which may improve data organization and processing efficiency.

Auto-Answer Staging System Reduces Redundant User Input

The auto-answer staging system 800 may automatically propagate answers from comprehensive questions to related specific questions using a conditional matcher and exception-based re-evaluation mechanism. This may improve computer system efficiency by reducing the number of questions users must answer while maintaining data consistency. The conditional matcher may ensure proper processing flow, and the re-evaluation mechanism may ensure all questions are properly updated when auto-answers are introduced, which may maintain data consistency across the question flow.

Combined Technical Improvements

Together, these technical improvements represent a specific technical solution to at least the problems of hard-coded logic, inefficient question ordering, sequential expression evaluation, cache key generation, data source complexity, schema coupling, hierarchical data collection, and redundant user input. The claimed system improves computer functionality through specific algorithms, architectures, and processing mechanisms that go beyond merely using a computer to perform abstract mental processes. Additionally, as described herein, each of the components provide concrete, technical solutions to various computer-specific problems. And, especially when considered in combination, the various components described herein provide an unconventional solution and technical capabilities (e.g., runtime configuration, no hard-coded logic, schema-agnostic, domain-agnostic, etc.) that conventional systems have previously lacked.

Examples of Hardware Profiles Useful with the Described Subject Matter

Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing system" encompasses all apparatus, devices, and machines for processing data, including by way of example a programmable processor, a computer, or multiple processors or computers. The system may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Embodiments and functional operations described in this specification may be implemented in digital electronic circuitry, or in computer software, firmware, or hardware, including the structures disclosed in this specification and their structural equivalents, or in combinations of one or more of them. For example, elements designated as engines, generators, identifiers, tools, analyzers, calculators, classifiers, checkers, finders, logic recorders, visualizers, aggregators, nodes, managers, organizers, algorithms, etc. may be implemented in a variety of ways.

A computer program (also known as a program, software, software application, script, or code) may be written in any form of programming language, including compiled or interpreted languages, and it may be deployed in any form, including as a standalone program or as a component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

A hardware processor is a complex electrical circuit that is configured to perform a predefined set of basic operations in response to receiving a corresponding basic instruction selected from a predefined native instruction set of codes. A well-known type of processor is a CPU or central processing unit. A CPU includes the arithmetic-logic unit (ALU) that performs arithmetic and logic operations, processor registers that supply operands to the ALU and store the results of ALU operations, and a control unit that orchestrates the fetching (from memory), decoding and execution (of instructions) by directing the coordinated operations of the ALU, registers, and other components. A processor or hardware processor may be embodied as other kinds of chips such as Graphics Processing Unit (GPU) used for parallel tasks, graphics, and AI; Mobile Processors (SoCs) used for integrated chips for smartphones and tablets; Digital Signal Processor (DSP) used for processing real-world signals (audio, video) (often in audio equipment, communication devices); and Neural Processing Units (NPU) for accelerating machine learning and AI tasks. Additional processors may include microcontrollers: small, self-contained computers in embedded systems (e.g., smart appliances); FPGAs (Field-Programmable Gate Arrays): reconfigurable chips for custom hardware functions; and TPUs (Tensor Processing Units). Examples of CPUs include: Intel Core® series, AMD Ryzen®, Intel Xeon®, AMD EPYC®. Examples of GPUs include: NVIDIA GeForce/RTX®, AMD Radeon®. Examples of SoCs (system on a chip) include: Apple® A-series/M-series, Qualcomm Snapdragon®, Samsung© Exynos, and MediaTek Dimensity®.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto optical disks; and CD ROM (Compact Disc Read-Only Memory) and DVD-ROM (Digital Versatile Disc Read-Only Memory) disks. The processor and the memory may be supplemented by, or incorporated in, special purpose logic circuitry.

To provide interaction with a user, embodiments may be implemented on a computer having a display device, like a TV or monitor (CRT (Cathode Ray Tube) or LCD (Liquid Crystal Display), etc.) for displaying information to the user. Computers may have peripherals like a keyboard, trackpad, mouse, etc. Other kinds of devices may be used to provide for interaction with a user as well; for example, feedback provided to the user may be any form of sensory feedback, e.g., visual feedback, auditory feedback, or tactile feedback;

and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computer and/or computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where a Hypertext Markup Language (HTML) file is mentioned, other file types or formats may be substituted. For instance, an HTML file may be replaced by an Extensible Markup Language (XML), JavaScript® Object Notation (JSON), plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

Computer System

FIG. 9 illustrates, in simplified schematic form, a computer system 9 on which aspects of the present disclosure can be practiced. The computer system 9 can include a hardware processor 90 communicatively coupled to a main memory 91 and to a data memory 91. The main memory 91 can be configured to store, on at least a non-transitory computer-readable storage medium as described in greater detail below, executable program code. The hardware processor 90 may include multiple hardware processors and/or multiple processor cores. The hardware processor 90 may include hardware processors from different devices, that cooperate. The computer system 9 may execute one or more basic instructions included in the executable program code stored in main memory 91.

The relationship between the executable program code in the main memory 91 and the hardware processor 90 is structural; the executable program code is provided to the hardware processor 90 by imparting various voltages at certain times across certain electrical connections, in accordance with binary values in the executable program code, to cause the hardware processor to perform some action, as now explained in more detail. The executable program code in the main memory 91 can include the domain-agnostic evaluation engine 200, the matcher expression evaluation system 300, the context object builder 400, the tiered priority comparator 500, the dynamic question pool manager 600, the container question architecture 700, the auto-answer staging system 800, the schema-agnostic data integration system 900, the ID mapping system 1000, the scrollable multi-screen body visualizer interface system 1100, and the exception-based re-evaluation mechanism 1200.

The predefined native instruction set of codes is specific to the hardware processor; the design of the processor defines the collection of basic instructions to which the processor will respond, and this collection forms the predefined native instruction set of codes.

A basic instruction may be represented numerically as a series of binary values, in which case it may be referred to as a machine code. The series of binary values may be represented electrically, as inputs to the hardware processor, via electrical connections, using voltages that represent either a binary zero or a binary one. These voltages are interpreted as such by the hardware processor.

Executable program code may therefore be understood to be a set of machine codes selected from the predefined native instruction set of codes. A given set of machine codes may be understood, generally, to constitute a module. A set of one or more modules may be understood to constitute an application program or "app." An app may interact with the hardware processor directly or indirectly via an operating system. An app may be part of an operating system.

Computer Readable Media (CRM)|Computer Program Product (CPM)

A computer program product is an article of manufacture that has a computer-readable medium with executable program code that is adapted to enable a processing system to perform various operations and actions. Stated differently, the executable program code can embody or functionality of instructions that cause a computer, e.g., that cause the processor, to perform particular operations or processes.

A computer-readable medium may be transitory or non-transitory. A transitory computer-readable medium may be thought of as a conduit by which executable program code may be provided to a computer system, a short-term storage that may not use the data it holds other than to pass it on.

The buffers of transmitters and receivers that briefly store only portions of executable program code when being downloaded over the Internet is one example of a transitory computer-readable medium. A carrier signal or radio frequency signal, in transit, that conveys portions of executable program code over the air or through cabling such as fiber-optic cabling provides another example of a transitory computer-readable medium. Transitory computer-readable media convey parts of executable program code on the move, typically holding it long enough to just pass it on.

Non-transitory computer-readable media may be understood as a storage for the executable program code. Whereas a transitory computer-readable medium holds executable program code on the move, a non-transitory computer-readable medium is meant to hold executable program code at rest. Non-transitory computer-readable media may hold the software in its entirety, and for longer duration, compared to transitory computer-readable media that holds only a portion of the software and for a relatively short time. The term, "non-transitory computer-readable medium," specifically excludes communication signals such as radio frequency signals in transit.

The following forms of storage exemplify non-transitory computer-readable media: removable storage such as a universal serial bus (USB) disk, a USB stick, a flash disk, a flash drive, a thumb drive, an external solid-state storage device (SSD), a compact flash card, a secure digital (SD) card, a diskette, a tape, a compact disc, an optical disc; secondary storage such as an internal hard drive, an internal SSD, internal flash memory, internal non-volatile memory, internal dynamic random-access memory (DRAM), read-only memory (ROM), random-access memory (RAM), and the like; and the primary storage of a computer system.

Different terms may be used to express the relationship between executable program code and non-transitory computer-readable media. Executable program code may be written on a disc, embodied in an application-specific integrated circuit, stored in a memory chip, or loaded in a cache memory, for example. Herein, the executable program code may be said, generally, to be "in" or "on" a computer-readable media. Conversely, the computer-readable media may be said to store, to include, to hold, or to have the executable program code.

Creation of Executable Program Code

Software source code may be understood to be a human-readable, high-level representation of logical operations. Statements written in the C programming language provide an example of software source code.

Software source code, while sometimes colloquially described as a program or as code, is different from executable program code. Software source code may be processed, through compilation for example, to yield executable program code. The process that yields the executable program code varies with the hardware processor; software source code meant to yield executable program code to run on one hardware processor made by one manufacturer, for example, will be processed differently than for another hardware processor made by another manufacturer.

The process of transforming software source code into executable program code is known to those familiar with this technical field as compilation or interpretation and is not the subject of this application.

User Interface

A computer system may include a user interface controller under control of the processing system that displays a user interface in accordance with a user interface module, i.e., a set of machine codes stored in the memory and selected from the predefined native instruction set of codes of the hardware processor, adapted to operate with the user interface controller to implement a user interface on a display device. Examples of a display device include a television, a projector, a computer display, a laptop display, a tablet display, a smartphone display, a smart television display, or the like.

The user interface may facilitate the collection of inputs from a user. The user interface may be graphical user interface with one or more user interface objects such as display objects and user activatable objects. The user interface may also have a touch interface that detects input when a user touches a display device.

A display object of a user interface may display information to the user. A user activatable object may allow the user to take some action. A display object and a user activatable object may be separate, collocated, overlapping, or nested one within another. Examples of display objects include lines, borders, text, images, or the like. Examples of user activatable objects include menus, buttons, toolbars, input boxes, widgets, and the like.

Communications

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

Means Plus Function

For any computer-implemented embodiment, "means plus function" elements will use the term "means;" the terms "logic" and "module" have the meaning ascribed to them above and are not to be construed as generic means. An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

Ordering of Steps

To the extent the subject matter has been described in language specific to structural features or methodological steps, it is to be understood that the subject matter defined in the appended claims is not necessarily limited to the specific features or steps described. Rather, the specific features and steps are disclosed as example forms of implementing the claimed subject matter.

Headings

To the extent headings are used, they are provided for the convenience of the reader and are not be taken as limiting or restricting the systems, techniques, approaches, methods, or devices to those appearing in any section. Rather, the teachings and disclosures herein can be combined or rearranged with other portions of this disclosure and the knowledge of one of ordinary skill in the art. It is intended that this disclosure encompass and include such variation. The indication of any elements or steps as "optional" does not indicate that all other or any other elements or steps are mandatory. The claims define the invention and form part of the specification. Limitations from the written description are not to be read into the claims.

Data Collection and Personal Information

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

Specific Embodiments

Certain attributes, functions, steps of methods, or sub-steps of methods described herein may be associated with physical structures or components, such as a module of a physical device that, in implementations in accordance with this disclosure, make use of instructions (e.g., computer executable instructions) that may be embodied in hardware, such as an application specific integrated circuit, or that may cause a computer (e.g., a general-purpose computer) executing the instructions to have defined characteristics. There may be a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an application programming interface (API). In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

While certain implementations have been described, these implementations have been presented by way of example only and are not intended to limit the scope of this disclosure. The novel devices, systems and methods described herein may be embodied in a variety of other forms; furthermore, various omissions, substitutions, and changes in the form of the devices, systems and methods described herein may be made without departing from the spirit of this disclosure.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A runtime-configurable question-and-answer system for dynamically determining question flow and question ordering, the question-and-answer system comprising:

one or more hardware processors; and one or more memories, coupled to the one or more hardware processors;

wherein the one or more hardware processors are configured to implement:

a domain-agnostic evaluation engine configured to evaluate matcher expressions against a context object containing session data, information, and prior answers, wherein the evaluation engine utilizes runtime configuration data for question generation, answer options, and branching logic, and wherein the evaluation engine is domain-agnostic until the runtime configuration data is loaded;

a matcher expression evaluation system configured to determine question visibility, qualification, and post-answer behavior using a plurality of configurable expression language expressions, wherein the matcher expression evaluation system supports three matcher types: an askWhen matcher type that determines whether a given question can be shown at all, an askIf matcher type that determines whether the given question should be shown now, and a contextUpdates matcher type that determines session state changes when the given question is answered;

a context object builder configured to build the context object from the session data, the information, and the prior answers, providing a unified evaluation environment; and a tiered priority comparator configured to determine the question ordering through a multi-tier comparison algorithm that supports both iteration behavior and grouping behavior, wherein the tiered priority comparator evaluates question candidates through a plurality of tiers, including two or more of: a first tier that evaluates current context bias as highest priority to enable the iteration behavior, a second tier that evaluates parent priority to maintain question line hierarchy, a third tier that evaluates current question line bias to enable the grouping behavior, a fourth tier that evaluates explicit question priority, and a fifth tier that evaluates question identifier as a deterministic tiebreaker.

2. The question-and-answer system of claim 1, wherein the matcher expression evaluation system is configured to:

compile the plurality of configurable expression language expressions into a plurality of compiled expressions for evaluation;

cache the compiled plurality of expressions using a threshold-based dual caching strategy, wherein each of the plurality of compiled expressions longer than a threshold length uses a checksum-based key for caching and each of the plurality of compiled expressions shorter than the threshold length uses a direct key for the caching; and process multiple matcher expressions in a single expression language context using batch evaluation to achieve improved performance compared to sequential evaluation.

3. The question-and-answer system of claim 1, wherein the plurality of tiers includes the first tier, and the first tier is configured to group questions with matching context values together to enable the iteration behavior, allowing the question-and-answer system to ask a same question type across multiple entities.

4. The question-and-answer system of claim 1, wherein the plurality of tiers includes the third tier, and the third tier is configured to allow questions with different contexts to group by current question line to enable the grouping behavior, allowing the question-and-answer system to complete all questions for one entity before moving to a next entity.

5. The question-and-answer system of claim 1, further comprising:

a dynamic question pool manager configured to manage question pools dynamically and update a question pool on-demand based on matcher evaluation results.

6. The question-and-answer system of claim 1, wherein plurality of tiers includes the second tier, and the second tier is configured to maintain the question line hierarchy by evaluating parent priority relationships between questions.

7. The question-and-answer system of claim 1, wherein plurality of tiers includes the fourth tier, and the fourth tier is configured to evaluate explicit question priority values assigned to questions.

8. The question-and-answer system of claim 1, wherein plurality of tiers includes the fifth tier, and the fifth tier is configured to use question identifiers as the deterministic tiebreaker when each other tier of the plurality of tiers is equal.

9. The question-and-answer system of claim 1, wherein the context object builder is configured to aggregate data from multiple sources including the session data, the information, and the prior answers into a single unified evaluation environment.

10. The question-and-answer system of claim 1, wherein the matcher expressions can access nested properties in the context object via a nested property access mechanism to perform calculations and call functions, and the nested property access mechanism enables access to properties at arbitrary depth levels without requiring knowledge of an underlying data source structure of the context object.

11. The question-and-answer system of claim 5, wherein the dynamic question pool manager is configured to update the question pool when the question pool becomes empty.

12. The question-and-answer system of claim 5, wherein the dynamic question pool manager is configured to update the question pool based on the matcher evaluation results indicating new eligible questions.

13. The question-and-answer system of claim 1, wherein the evaluation engine operates without domain-specific knowledge until the runtime configuration data is loaded, and the runtime configuration data provides domain-specific configuration data for the question generation, the answer options, and the branching logic.

14. The question-and-answer system of claim 1, wherein the runtime configuration data is loadable at runtime without requiring code deployment or system restart, enabling dynamic reconfiguration of the question generation, the answer options, and the branching logic.

15. The question-and-answer system of claim 1, wherein the unified evaluation environment enables matcher expressions to access data from the session data, the information, and the prior answers using a single expression syntax without requiring knowledge of an underlying data structure of the context object.

16. The question-and-answer system of claim 1, wherein the tiered priority comparator enables switching between the iteration behavior and the grouping behavior based on context values, allowing the question-and-answer system to ask a same question type across multiple entities when the context values match and to complete all questions for one entity before moving to a next entity when the context values are different.

17. A method for dynamically determining question flow and question ordering in a runtime-configurable question-and-answer system, the method comprising:

building, by at least one computer processor, a context object from session data, information, and prior answers using a context object builder;

evaluating matcher expressions against the context object using a domain-agnostic evaluation engine, wherein the evaluation engine utilizes runtime configuration data for question generation, answer options, and branching logic, and wherein the evaluation engine is domain-agnostic until the runtime configuration data is loaded;

determining question visibility, qualification, and post-answer behavior using a matcher expression evaluation system that supports three matcher types: an askWhen matcher type that determines whether a given question can be shown at all, an askIf matcher type that determines whether the given question should be shown now, and a contextUpdates matcher type that determines session state changes when the given question is answered; and determining the question ordering using a tiered priority comparator that evaluates question candidates through a plurality of tiers, including two or more of: a first tier that evaluates current context bias as highest priority to enable iteration behavior, a second tier that evaluates parent priority to maintain question line hierarchy, a third tier that evaluates current question line bias to enable grouping behavior, a fourth tier that evaluates explicit question priority, and a fifth tier that evaluates question identifier as a deterministic tiebreaker, wherein the tiered priority comparator supports both the iteration behavior and the grouping behavior.

18. The method of claim 17, further comprising:

compiling a plurality of expression language expressions into a plurality of compiled expressions for evaluation;

caching each of the plurality of compiled expressions using a threshold-based dual caching strategy, wherein each of the plurality of compiled expressions that is longer than a threshold length uses a checksum-based key for the caching and each of the plurality of compiled expressions that is shorter than the threshold length uses a direct key for the caching; and processing multiple matcher expressions in a single expression language context using batch evaluation to achieve improved performance compared to sequential evaluation.

19. The method of claim 17, wherein the plurality of tiers includes the first tier, and the first tier groups questions with matching context values together to enable the iteration behavior, allowing the question-and-answer system to ask a same question type across multiple entities.

20. The method of claim 17, wherein the plurality of tiers includes the third tier, and the third tier allows questions with different contexts to group by current question line to enable the grouping behavior, allowing the question-and-answer system to complete all questions for one entity before moving to a next entity.

21. The method of claim 17, further comprising:

managing question pools dynamically and updating a question pool on-demand based on matcher evaluation results.

22. The method of claim 17, wherein the plurality of tiers includes the second tier, and the second tier maintains the question line hierarchy by evaluating parent priority relationships between questions.

23. The method of claim 17, wherein the plurality of tiers includes the fourth tier, and the fourth tier evaluates explicit question priority values assigned to questions.

24. The method of claim 17, wherein the plurality of tiers includes the fifth tier, and the fifth tier uses question identifiers as the deterministic tiebreaker when each other tier of the plurality of tiers is equal.

25. A non-transitory computer-readable storage medium storing instructions that, when executed by one or more hardware processors, cause the one or more hardware processors to perform operations comprising:

building a context object from session data, information, and prior answers using a context object builder;

evaluating matcher expressions against the context object using a domain-agnostic evaluation engine, wherein the evaluation engine utilizes runtime configuration data for question generation, answer options, and branching logic, and wherein the evaluation engine is domain-agnostic until the runtime configuration data is loaded;

determining question visibility, qualification, and post-answer behavior using a matcher expression evaluation system that supports three matcher types: an askWhen matcher type that determines whether a given question can be shown at all, an askIf matcher type that determines whether the given question should be shown now, and a contextUpdates matcher type that determines session state changes when the given question is answered; and determining question ordering using a tiered priority comparator that evaluates question candidates through a plurality of tiers, including two or more of: a first tier that evaluates current context bias as highest priority to enable iteration behavior, a second tier that evaluates parent priority to maintain question line hierarchy, a third tier that evaluates current question line bias to enable grouping behavior, a fourth tier that evaluates explicit question priority, and a fifth tier that evaluates question identifier as a deterministic tiebreaker, wherein the tiered priority comparator supports both the iteration behavior and the grouping behavior.

26. The non-transitory computer-readable storage medium of claim 25, wherein the operations further comprise:

compiling a plurality of expression language expressions into a plurality of compiled expressions for evaluation;

caching each of the plurality of compiled expressions using a threshold-based dual caching strategy, wherein each of the plurality of compiled expressions that is longer than a threshold length uses a checksum-based key for the caching and each of the plurality of compiled expressions that is shorter than the threshold length uses a direct key for the caching; and processing multiple matcher expressions in a single expression language context using batch evaluation to achieve improved performance compared to sequential evaluation.

27. The non-transitory computer-readable storage medium of claim 25, wherein the plurality of tiers includes the second tier, and the second tier maintains the question line hierarchy by evaluating parent priority relationships between questions.

28. A runtime-configurable question-and-answer system for dynamically determining question flow and question ordering, the question-and-answer system comprising:

one or more hardware processors; and one or more memories, coupled to the one or more hardware processors;

wherein the one or more hardware processors are configured to implement:

means for evaluating matcher expressions against a context object containing session data, information, and prior answers using a domain-agnostic evaluation engine that utilizes runtime configuration data for question generation, answer options, and branching logic, and that is domain-agnostic until the runtime configuration data is loaded;

means for determining question visibility, qualification, and post-answer behavior using a plurality of configurable expression language expressions that support three matcher types: an askWhen matcher type that determines whether a given question can be shown at all, an askIf matcher type that determines whether the given question should be shown now, and a contextUpdates matcher type that determines session state changes when the given question is answered;

means for building the context object from the session data, the information, and the prior answers, providing a unified evaluation environment; and means for determining the question ordering through a multi-tier comparison algorithm that supports both iteration behavior and grouping behavior, wherein the means for determining the question ordering evaluates candidates through a plurality of tiers, including at least two of: a first tier that evaluates current context bias as highest priority to enable the iteration behavior, a second tier that evaluates parent priority to maintain question line hierarchy, a third tier that evaluates current question line bias to enable the grouping behavior, a fourth tier that evaluates explicit question priority, and a fifth tier that evaluates question identifier as a deterministic tiebreaker.

29. The question-and-answer system of claim 28, wherein the plurality of tiers includes the first tier, and the means for determining the question ordering is configured to evaluate the first tier to group questions with matching context values together to enable the iteration behavior.

30. The question-and-answer system of claim 28, wherein the plurality of tiers includes the third tier, and the means for determining the question ordering is configured to evaluate the third tier to allow questions with different contexts to group by current question line to enable the grouping behavior.

* * * * *